US006790673B1

(12) United States Patent
Kingston

(10) Patent No.: US 6,790,673 B1
(45) Date of Patent: Sep. 14, 2004

(54) SPECIATED ISOTOPE DILUTION MASS SPECTROMETRY OF REACTIVE SPECIES AND RELATED METHODS

(75) Inventor: Howard M. Kingston, Pittsburgh, PA (US)

(73) Assignee: Duquesne University of the Holy Ghost, Pittsburgh, PA (US)

( * ) Notice: Subject to any disclaimer, the term of this patent is extended or adjusted under 35 U.S.C. 154(b) by 27 days.

(21) Appl. No.: 09/015,469

(22) Filed: Jan. 29, 1998

(51) Int. Cl.[7] .......................... G01N 33/20; G01N 1/10; B01D 59/44
(52) U.S. Cl. ...................... 436/173; 250/282; 250/288; 436/56; 436/73; 436/74; 436/83; 436/161; 436/179
(58) Field of Search .............................. 436/56, 73–74, 436/83, 161, 173, 179; 250/282–284, 288

(56) References Cited

U.S. PATENT DOCUMENTS 5,414,259 A * 5/1995 Kingston .................... 250/283

OTHER PUBLICATIONS

Swift, E. H. et al, "Quantitative Measurements and Chemical Equiliria" 1972, W. H. Freeman and Company; San Francisco, pp. 516–517.*
Des Rosiers, C. et al, Analytical Biochemistry 1988, 173, 96–105.*
Hidy, G. M. Atmospheric Environment 1988, 22, 1801–1820.*
Thomas, L. C. et al, Talanta 1992, 39, 201–206.*
Doerge D. R. et al, Analytical Chemistry 1992, 64, 1212–1216.*
Suzuzki–Sawada, J. et al, Analytical Biochemistry 1992, 207, 203–207.*
Vogt, J. A. et al, Biological Mass Spectrometry 1993, 22, 600–612.*
Thienpont, L. M. et al, Journal of Mass Spectrometry 1996, 31, 1119–1125.*
Hintelmann, H. et al, Fresenius J. Anal. Chem. 1997, 358, 363–370.*
Hintelmann, H. et al, Fresenius J. Anal. Chem. 1997, 358, 378–385.*
L.J. Moore et al, *Anal. Chem.* 1974, 46, 1082–1089.*
J. Rosenblatt et al. Am. J. Physiol. 1988, 254, E526–E531, Apr. 1988.*
D. Chen et al. Anal. Chim. Acta 1991, 245, 49–55, 1991.*
D. R. Doerge et al. Anal. Chem. 1992, 64, 1212–1216, Jun. 1992.*
H. Klinkenberg et al. Spectrochim. Acta 1993, 48B, 649–661, May 1993.*

(List continued on next page.)

*Primary Examiner*—Arlen Soderquist
(74) *Attorney, Agent, or Firm*—Arnold B. Silverman

(57) ABSTRACT

A method of speciated isotope dilution mass spectrometry (SIDMS) which will permit determination of concentrations of one or more species from a sample even if the sample has been subjected to species conversion prior to species separation or degradation or incomplete separation exists. At least one predetermined stable isotope is spiked to convert the stable isotope to a speciated enriched isotope corresponding to the specie or species to be measured in the sample. The sample containing the species to be measured is spiked and the isotopic spiked specie and species to be measured are equilibrated. The species are separated from the sample and an isotope ratio determination for each specie to be measured is made. The species concentrations are then mathematically deconvoluted while correcting for species conversion and/or incomplete separation. The method may be employed to validate other methods. The method may also be employed in the preparation and analysis of speciated standard reference materials. The method may be employed in quantifying Cr(III) and Cr(VI).

30 Claims, 10 Drawing Sheets

OTHER PUBLICATIONS

M. E. Ketterer et al. Anal Chem. 1995, 67, 4004–4009, Nov. 1995.*

K. T. Suzuki Tohoku J. Exp. Med. 1996, 178, 27–35, Jan. 1996.*

D. C. Liebler et al. Anal. Biochem. 1996, 236, 27–34, 1996.*

M. A. J. Hullar et al. Appl. Environ. Microbiol. 1996, 2489–2493, Jul. 1996.*

L. M. Thienpont et al. J. Mass Spectrom. 1996, 31, 1119–1125, Nov. 1996.*

G. E. Kozerski et al. Anal. Chem. 1997, 69, 783–788, Feb. 1997.*

J. I. Garcia–Alonso et al. J. Mass Sectrom. 1997, 32, 556–564, May 1997.*

H. Hintelmann et al. Fresenius' J. Anal. Chem. 1997, 358, 363–370, 1997.*

L. Moens Fresenius' J. Anal. Chem. 1997, 359, 309–316, 1997.*

T. Walczyk et al. Fresenius' J. Anal. Chem. 1997, 359, 445–449, 1997.*

G. Slawyk et al, Mar. Ecol.: Prog. Ser. 1995, 124, 289–299, Aug. 1995.*

M.–K. Lee et al, Am. J. Sci. 1996, 296, 965–988, Aug. 1995.*

A. H. G. Love in "Chromium: Metabolism and Toxicity" D. Burrows Ed. CRC Press, Inc.: Boca Raton, Florida, 1983, pp. 1–12.*

S. Langard in "Chromium: Metabolism and Toxicity" D. Burrows, Ed. CRC Press, Inc.: Boca Raton, Florida, 1983, pp. 13–30.*

K. G. Heumann Int. J. Mass Spectrom. Ion Precesses 1992, 118–119, 575–592.*

R. Nusko et al. Anal. Chim. Acta 1994, 286, 283–290.*

K. G. Heumann et al. J. Anal. At. Spectrom. 1994, 9, 1351–1355.*

A. D. Anbar et al. Anal. Chem. 1997, 69, 2444–2450.*

H. M. Kingston et al. Spectrochim. Acta, Part B 1998, 53B, 299–309.*

Allen, H. E. et al., *Metal Speciation and Contamination of Soil,* Lewis Publisher: Boca Raton, Florida, 1995 (pp. 3–24, 88, 114–168, 188, 199, 259, 261, 280, 293, 331–332, 335, 341, 343).

Batley, G. E., *Trace Element Speciation: Analytical Methods and Problems,* CRC Press: Boca Raton, Florida, 1989 (pp. 1–24, 25–41, 61, 185–188, 195–197, 205–217, 320, 323).

Das, A. K. et al., *Metal Speciation in Biological Fluids—A Review,* Mikrochim. Acta 1996, 122 (pp. 209–246).

Kramer, J. R. et al., *Metal Speciation: Theory, Analysis and Application,* Lewis Publishers: Chelsea, Michigan, 1991 (pp. 41–68, 155–172, 261–289, 308–312).

Krull, I. S., *Trace Metal Analysis and Speciation,* Journal of Chromatography, Library—vol. 47, Elsevier: Oxford, 1991 (pp. 1–2, 21–30, 38, 101–120, 213–217, 231).

Van Loon, J. C. et al., *Overview of Analytical Methods for Elemental Speciation,* Analyst (London) 1992, 117 (pp. 563–570).

Vela, N. P. et al., *Elemental Speciation with Plasma Mass Spectrometry,* Anal. Chem., 1993, 65 (pp. 585A–597A).

Donard, O. F. X. et al., *Microwave–Assisted Leaching of Organotin Compounds from Sediments for Speciation Analysis,* Anal. Chem. 1995, 67 (pp. 4250–4254).

SW–846 EPA Method 3060A: *Alkaline Digestion of Hexavalent Chromium, Test Methods for Evaluating Solid Waste,* 3rd update, U.S. Environmental Protection Agency: Washington, DC, 1997 (3060A–1–3060A–15).

James, B. P. et al., *Hexavalent Chromium Extraction from Soils: A Comparison of Five Methods,* Environ. Sci. & Tech. 1995, 29 (pp. 2377–2381).

Vitale, R. J. et al., *Hexavalent Chromium Extraction from Soils: Evaluation of an Alkaline Digestion Method,* J. of Environ. Qual. 1994, 23 (pp. 1249–1256).

Vitale, R. J. et al., *Hexavalent Chromium Quantification in Soils: An Effective and Reliable Procedure,* Am. Environ. Lab. 1995, 7, 1.

SW–846 EPA Method 7196A: *Chromium, Hexavalent (colorimetric), Test Methods for Evaluating Solid Waste,* 3rd ed., U.S. Environmental Protection Agency: Washington, D.C, 1996 (7196A–1–7196A–6).

Nazario, C. L. et al., *Comparative Study of Analytical Methods for Hexavalent Chromium,* J. Am. Leather Chem. Assoc. 1990, 85 (pp. 212–224).

Harzdorf, A. C., *Analytical Chemistry of Chromium Species in the Environment, and Interpretation of Results,* Int. J. Environ. Anal. Chem. 1987, 29 (pp. 249–261).

Milacic, R. et al., *Critical Evaluation of Three Analytical Techniques for the Determination of Chromium (vi) in Soil Extracts,* Analyst (London) 1992, 117 (pp. 125–130).

Fong, W. et al., *Chromium Speciation Using Ion Chromatography–Atomic Absorption System With On–Line Preconcentration,* Spectrosc. Lett. 24 (7&8), 1991 (pp. 931–941).

Beceiro–Gonzalez, E. et al., *Speciation of Chromium by the Determination of Total Chromium and Chromium (III) by Electrothermal Atomic Absorption Spectrometry,* J. Anal. At. Spectrom. 1993, 8 (pp. 649–653).

Peraniemi, S. et al., *Separation of Microgram Quantities of Cr(III) Cr(VI) in Aqueous Solutions and Determination by Energy Dispersive X–ray Fluorescence Spectrometry,* Anal. Chim. Acta 1995, 315 (pp. 365–370).

Beceiro–Gonzalez, E. et al., *Separation of Cr(III) and Cr(VI) Using Complexation of Cr(III) With 8–Hydroxyquinoline and Determination of Both Species in Waters by ETA–AAS,* Fresenius' J. Anal. Chem. 1992, 344 (pp. 301–305).

Hassan, S. S. M. et al., *Hydrogen Chromate PVC Matrix Membrane Sensor for Potentiometric Determination of Chromium (III) and Chromium (VI) Ions,* Talanta 1996, 43 (pp. 797–804).

Behne, D., *Speciation of Trade Elements in Biological Materials: Trends and Problems,* Analyst (London) 1992, 117 (pp. 555–557).

Paniagua, A. R. et al., *Determination of Chromium (VI) and Chromium (III) by Using a Diphenylcarbazide–Modified Carbon Paste Electrode,* Electroanalysis (NY) 1993, 5 (pp. 155–163).

Achterberg, E. P. et al., *Automated Voltammetric System for Shipboard Determination of Metal Speciation in Sea Water,* Anal. Chim. Acta 1994, 284 (pp. 463–471).

Michalke, B., *Capillary Electrophoresis—A Useful Tool in Speciation Investigation,* Fresenius' J. Anal. Chem. 1996, 354 (pp. 557–565).

De Smaele, T. et al., *ICP–MS—A Sensitive Detector for Metal Speciation With Capillary GC,* LC GC Int. 0 1996, 9 (pp. 138–140, 142).

Pobozy, E. et al., *Ion Chromatographic Speciation of Chromium With Diphenylcarbazide–based Spectrophotometric Detection,* J. Chromatogr., A 1996, 736 (pp. 141–150).

Tomlinson, M. J. et al., *Speciation of Toxicologically Important Transition Metals Using Ion Chromatography with Inductively Coupled Plasma Mass Spectrometric Detection,* J. Anal. At. Spectrom. 1994, 9 (pp. 957–964).

Udy, M. J., *Chromium: Chemistry of Chromium and Its Compounds,* Reinhold Publishing Corporation, New York, 1956, vol. I (pp. 53–75).

Weckhuysen, B. M. et al., *Surface Chemistry and Spectroscopy of Chromium in Inorganic Oxides,* Chem. Rev. 1996, 96 (pp. 3327–3349).

Paustenbach, D. J. et al., *An Assessment and Quantitative Uncertainty Analysis of the Health Risks to Workers Exposed to Chromium Contaminated Soils,* Toxicology and Industrial Health, 1991, 7 (pp. 159–196).

Nriagu, J.O. et al., *Chromium in the Natural and Human Environments,* Nriagu, J.O., Ed. In Advances in Environmental Science and Technology, John Wiley & Sons: New York, 1988, vol. 20 (pp. 1–105).

SW–846 EPA Method 6800: *Elemental and Speciated Isotope Dilution Mass Spectrometry, Test Methods for Evaluating Solid Waste,* Update 4, 1998.

Lagerwaard, A. et al., *An Independent Accurate Reference Method of the Determination of Chromium in Biological Materials,* Fresenius' J. Anal. Chem. 1995, 351 (pp. 786–789).

Van Raaphorst, J. G. et al., *Accurate and Precise Determination of Chromium by Isotope Dilution Mass Spectrometry in Some Environmental Materials,* Anal. Chim. Acta 1994, 286 (pp. 291–296).

Fassett, J. D. et al., *Isotope Dilution Mass Spectrometry for Accurate Elemental Analysis,* Anal. Chem. 1989, 61 (pp. 643A–644A, 646A, 648A–649A).

Moore, L. J. et al., *The Use of Isotope Dilution Mass Spectrometry for the Certification of Standard Reference Materials,* Environ. International 1984, 10 (pp. 169–173).

Kingston, H. M. et al., *Preconcentration of Trace Metals in Environmental and Biological Samples by Cation Exchange Resin Filters for X–ray Spectrometry,* Anal. Chem. 1981, 53 (pp. 223–227).

Tanzer, D. et al., *Determination of Dissolved Selenium Species in Environmental Water Samples Using Isotope Dilution Mass Spectrometry,* Anal. Chem. 1991, 63 (pp. 1984–1988).

Bowers, Jr., George N. et al., *Isotope Dilution Mass Spectrometry and the National Reference System,* Analytical Chemistry, vol. 65. No. 12, Jun. 15, 1993 (pp. 475R–479R).

Wiederin, D. et al., *Chromium Speciation Using CETAC, Column ANX4605–CR,* CETA Corporation: Omaha, NE, 1994 (pp. 1–25, Dialog pp. 4–10 and 16).

Welch, Michael J., *Determination of Serum Creatinine by Isotope Dilution Mass Spectrometry as a Candidate Definitive Method,* Analytical Chemistry, 58, 1986 (pp. 1681–1685).

Ellerbe, Polly et al., *Determination of Serum Uric Acid by Isotope Dilution Mass Spectrometry as a New Candidate Definitive Method,* Analytical Chemistry. 62, 1990, (pp. 2173–2177).

Ellerbe, Polly et al., *Determination of Serum Cholesterol by a Modification of the Isotope Dilution Mass Spectrometric Definitive Method,* Analytical Chemistry, 61, 1989 (pp. 1718–1723).

Begley, I. S. et al., *Occurance and Reduction of Noise in Inductively Coupled Plasma Mass Spectrometry for Enhanced Precision in Isotope Ratio Measurement,* J. Anal. Atom. Spectrom. 1994, 9 (pp. 171–176).

Russ, G.P., III et al., *Isotopic Ratio Measurements With an Inductively Coupled Plasma Source Mass Spectrometer,* Spectrochima Acta, Part B 1987, 42b (pp. 49–62).

Russ, III, G.P., Isotope Measurements Using ICP–MS, Applications of Inductively Coupled Plasma Mass Spectrometry, Date, A.R., Gray, A.L., Eds., Chapman and Hall: New York, 1989 (pp. 90–114).

Jarvis, K.E. et al., *Isotope Ratio Measurement,* Handbook of Inductively Coupled Plasma Mass Spectrometry, Blakie Academic & Professional: London, 1992 (Chap. 11, pp. 310–337).

Kingston, H. M. et al., *Microwave–Enhanced Chemistry: Fundamentals, Sample Preparations and Applications,* American Chemical Society: Washington, DC, 1997 (pp. 55–127, 257–281).

Dionex, *Determination of Cr(VI) in Water, Wastewater, and Solid Waste Extracts,* Ion Chromatography Recipe Book, Dionex Corporation: Sunnyvale, CA, 1990, Vol. Technical Note 26 (pp. 1–7).

Lu, Y. et al., *Determination of Analytical Biases and Chemical Mechanisms in the Analysis of Cr(VI) Using EPA Protocols,* Environ. Sci. & Tech., 1997 (pp. 1–33).

* cited by examiner

CR(III)

Cr(VI)

SPECIATED ISOTOPE DILUTION MASS SPECTROMETRY OF REACTIVE SPECIES AND RELATED METHODS

BACKGROUND OF THE INVENTION

1. Field of the Invention

The present invention relates to a method of employing enriched speciated isotope spikes in the same speciated form as a specie to be measured regardless of incomplete extraction or the presence of conversion, partial destruction, and instability.

2. Description of the Prior Art

The need for making quantitative determinations of a specie of interest occurs in many contexts including environmental, biological, pharmaceutical and industrial samples and in standard reference materials. For example, certain forms of an element or molecular species may exhibit different toxicities or chemical behaviors from others. Existing techniques, with the exception of electrochemical methods, rely predominately on physical separation and time. They are incapable of determining whether the species cross-over (transformation of one specie form into another), are lost, created or are altered or are completely recovered. Such techniques cannot be used to determine transformation of one species into another, destruction or generation during storage, manipulation and sample preparation during the measurement process, or in the separations that are incomplete or variable in measurement processes.

An example of the criticality of such measurements would be to consider chromium. While Cr(III) is a trace element essential for human health, Cr(VI) is poisonous to humans and most other animals and is also a carcinogen. As a result, the difference between these two species, which resides in the oxidation state of the element, may be of critical importance. While chromatography can be used to separate Cr(III) in time resolution from Cr(VI), as each specie can react with its surroundings and even with separating agencies, the chromatographic separation is only a snapshot in time recording the state of affairs at the end of the manipulation. Each specie may have reacted with many other reagents and transformed during the analysis. There is, therefore, with time resolution, no way of determining how much chromium was actually in each specie when the experiment began or when the sample was actually taken.

Specific species are often required for a particular process. For example, barium is toxic in some compound forms, but is also prescribed for medical diagnostic x-ray tests, usually as barium sulfate in liquid slurry form. The conformation and evaluation of a body's processing of barium into another specie can be accomplished with isotopically labeled barium sulfate. These studies have been done, but the use of speciated isotope dilution measurements has not been used for such analysis.

Some isotopic tracking has been done for lead due to terrestrially unique and naturally occurring isotopic composition differences of this element. The isotopic ratios can be matched with a particular source to determine the origin of the lead. These measurements are not speciated measurements, but depend on the isotopic ratio differences of the natural material to be detected. This technique has also been used for lead pottery glazes to determine the origin of art objects, however in this case also, naturally occurring isotopic ratios were determined. Lead is a uniquely feasible non-radioactive element to be evaluated as to origin by the isotopic ratio method, as its isotopic ratios change with the amount of uranium mixed with the lead in the original ore deposits. The decay of uranium into different lead isotopes creates unique isotopic ratios for different lead deposits.

The development of modern analytical instrumentation has focused on the accurate determination of lower and lower concentrations. Techniques have addressed the measurement of major, minor, trace, and ultratrace levels of elements. At each analysis level, these techniques have been concerned primarily with bulk concentrations of the analytes.

My prior U.S. Pat. No. 5,414,259 discloses a method of measuring the elemental species present in a particular sample, not only its bulk elemental concentration. The disclosure of this patent is expressly incorporated herein by reference.

It may be desired to measure a species for a variety of reasons, including characterization and evaluation of systems in environmental science, medicine, biological process monitoring, nutrition, and industry, for example. As the chemistry in these processes is inherently species-specific, the presence of trace elements is measured at the speciated level. For example, Cr(III) is a trace element essential for human health, while Cr(VI) is a poison and carcinogen to both humans and other animals. Each of these forms is a species of chromium, and each has associated with it unique chemical reactions. The difference lies in the elements' oxidized states. Examples of other species of potential interest are combinations of inorganic ions and covalently bound to organic molecules such as mercury and methylmercury. Others are different chelated species with different ligands and still others are different organic molecules entirely. There are many species described in the chemical literature and a general reference method for distinguishing many of them is highly desirable in order to determine if alterations in their concentrations and relevant abundances have changed during chemical processing and measurement.

Methods of elemental speciation have been known. See Allen, H. E.; Huang, C. P.; Bailey, G. W.; Bowers, A. R. *Metal Speciation and Contamination of Soil*; Lewis Publisher: Boca Raton, Fla., 1995; Batley, G. E. *Trace Element Speciation: Analytical Methods and Problems*; CRC Press: Boca Raton, Fla., 1989; Das, A. K.; Chakraborty, R.; Cervera, M. L.; de la Guardia, M. *Mikrochim. Acta* 1996, 122, 209–246; Kramer, J. R.; Allen, H. E. *Metal Speciation: Theory, Analysis and Application*; Lewis Publishers: Chelsea, Michigan, 1991; Krull, I. S. *Trace Metal Analysis and Speciation*; Elsevier: Oxford, 1991; Van Loon, J. C.; Barefoot, R. R. *Analyst (London)* 1992, 117, 563–570; Vela, N. P.; Olson, L. K.; Caruso, J. A. *Anal. Chem.* 1993, 65, 585a–597a. Several specific problems that cause errors in speciation analysis are identified in this literature. Currently, only bulk measurements of total element concentrations can be made routinely and accurately. Several potential problems may exist with speciation methods. Many species are reactive, and are transformed or converted to other species during the sampling, storage, and measurement steps. Also, species continue to react during these processes and may be altered many times prior to the numerical measurement. Further, these classical methods do not correct for the species' possible reaction with separating agents. As a result, although analysis through these methods may be both precise and replicable, the results of such analysis are not fully reliable. For example, the state of California has enacted legislation relating to the analysis of Cr(VI) in water, soils and contaminated wastes, even though there are no fully accurate methods to make these measurements. For regulatory purposes, environmental solutions thus far frequently have been to analyze samples for total chromium and assume all chromium may be in the +6 oxidation state. This may be safe, but it is an unsophisticated solution and wastes a significant amount of money on unnecessary remediation. Other methods with unknown accuracy have also been applied, such as a pair of US EPA RCRA (United States Environmental Protection Agency's Resource Conservation and Recovery Act) Methods 3060, which is an alkaline extraction for isolating Cr(VI) from soils and solid materials, and 7196, which is an ultraviolet-visible colorimetric method for the quantification of Cr(VI). These methods have biases and are inaccurate in various kinds of sample matrices with no way to evaluate their own accuracy and require another method to validate them. Until now there has been no validation method or way to evaluate bias in these methods. While some methods may be accurate for some matrices and invalid for others there has been up to now no way to tell which and no method of validating a method for specific matrices where it is appropriate.

Traditional methodologies do not accurately analyze species concentrations. For example, results reported in a recent paper noted degradation during the extraction process. To counteract degradation, shorter extraction times were used to extract tin species. Known methods do not provide means for correction for species degradation or correct for or evaluate extraction inefficiency. See Donard, O. F. X.; Lalère, B.; Martin, F.; Lobinski, R. *Anal. Chem.* 1995, 67, 4250–4254. Methods such as these are used to obtain consensus of species concentration where consistent precision is assumed to be accuracy and where systematic errors are ignored in the certification of standard reference materials. In these cases, errors in standard materials and in the validation of methods used in their certification are reproducible and transferable and tend to become incorporated into both analytical techniques and into standards certified using them. Systematic bias cannot be evaluated due to the fact that no additional degree of freedom exists in these methods to evaluate accuracy of method protocols and standards produced from these protocols.

The traditional analytical methods required a complete extraction prior to analytical detection. To address this balance between extraction efficiency and species degradation requires a technique that is not subject to these quantitative limitations. The decomposition of the matrix to free the species from the sample while preserving the species itself, is a complex task requiring extensive preparation. The separation of one species from the other is also required due to the inability of most detectors to distinguish between species. The conversion of a species, such as Cr(VI) during the analysis process, has been known. For example, EPA Method 3060A (SW-846 EPA Method 3060A: Alkaline Digestion of Hexavalent Chromium, *Test Methods for Evaluating Solid Waste*, 3rd update; U.S. Environmental Protection Agency: Washington, D.C., 1997) uses alkaline digestion to preserve Cr(VI) and attempt to resist reduction of Cr(VI) to Cr(III) during the extraction process (James, B. R.; Petura, J. C.; Vitale, R. J.; Mussoline, G. R. *Environ. Sci. & Tech.* 1995, 29, 2377–2381; Vitale, R. J.; Mussoline, G. R.; Peura, J. C.; James, B. R. *J. of Environ. Qual.* 1994, 23, 1249–1256; Vitale, R. J.; Mussoline, G. R.; Petura, J. C.; James, B. R. *Am. Environ. Lab.* 1995, 7, 1). The degree of success depends on the matrix and it is not known for which matrices the method is valid. As a result the method is generally employed with known inaccuracies existing. EPA Method 7196A (SW-846 EPA Method 7196A: Chromium, Hexavalent (colorimetric), *Test Methods for Evaluating Solid Waste*, 3rd ed., U.S. Environmental Protection Agency: Washington, D.C., 1996), a UV-Vis detection method for Cr(VI), has been used extensively to quantify Cr(VI) by detecting the violet-colored complex, Cr(VI)-diphenylcarbazide at pH 2 (Nazario, C. L.; Menden, E. E. *J. Am. Leather Chem. Assoc.* 1990, 85, 212–224). Several problems arise, however, when this method is applied to samples with complex matrices (Harzdorf, A. C. *Int. J. Environ. Anal. Chem.* 1987, 29, 249–261; Milacic, R.; Stupar, J.; Kozuh, N.; Korosin, J. *Analyst (London)* 1992, 117, 125–130). Such coexisting matrix components as $Fe^{2+}$ and some organic matter, can interfere with the Cr(VI) by reducing it during measurement (SW-846 EPA Method 7196A: Chromium, Hexavalent (colorimetric), *Test Methods for Evaluating Solid Waste*, 3rd ed., U.S. Environmental Protection Agency: Washington, D.C., 1996). Known methods do not validate these methods for specific matrix and sample types. Similar problems exist for other methods for speciated measurement for other reactive species.

Methods for speciated measurement primarily involve physical separation of species of interest from other forms of the same element and analysis of this subsample (Fong, W.; Wu, J. C. G. *Spectrosc. Lett.* 1991, 24, 931–941; Beceiro Gonzalez, E.; Bermejo Barrera, P.; Bermejo Barrera, A.; Barciela Garcia, J.; Barciela Alonso, C. *J. Anal. At. Spectrom.* 1993, 8, 649–653; Peraniemi, S.; Ahlgren, M. *Anal. Chim. Acta* 1995, 315, 365–370; Beceiro Gonzalez, E.; Barciela Garcia, J.; Bermejo Barrera, P.; Bermejo, B. *Fresenius' J. Anal. Chem.* 1992, 344, 301–305). This approach generally assumes that species conversion is negligible in the subsequent processing and analysis steps. However, this is not necessarily the case. Separation of the species of interest from the rest of the matrix can complicate and prolong the analytical procedure. For example, chromatography can separate two different forms of Cr in a mixture before presentation to elemental detectors, such as ICP-MS. As each species can react with its surroundings, and even with the separating agents, detection after a chromatographic separation is only a determination of the species distribution at that latter time and incorporates all altering concentration shifts. Each species may react with other sample components and reagents, or be transformed during the storage and analysis steps (Behne, D. *Analyst (London)* 1992, 117, 555–557), therefore, there is no reliable way to determine how much chromium was actually present in each speciated form when the sample was originally taken or prior to any manipulation step in the complete method. Such problems lead to biases and inaccuracies that limit the use of these measurements in environmental decision-making and for other purposes, such as use in court, for example.

A review of Analytical Abstracts Database (Royal Society of Chemistry, England) for both chromium and speciation shows that a variety of different approaches have been used for speciated chromium analysis. These are primarily electrochemistry, extraction and chromatography. Electrochemical methods can distinguish between the two different forms of chromium in a simple mixture, based on the different reduction potentials of the respective species, but matrix components can complicate samples, especially from residual organic compounds, and interfere with measurement and may completely observe the measurement in actual environmental samples. (Hassan, S. S. M.; Abbas, M. N.; Moustafa, G. A. E. *Talanta* 1996, 43, 797–804; Paniagua, A. R.; Vazquez, M. D.; Tascon, M. L.; Sanchez Batanero, P. *Electroanalysis (N. Y.)* 1993, 5, 155–163; Achterberg, E. P.; Van den Berg, C. M. G. *Anal. Chim. Acta* 1994, 284, 463–471). For more complex sample matrices, chromatography can physically separate Cr(III) from Cr(VI)

before detection (Michalke, B. *Fresenius' J. Anal. Chem.* 1996, 354, 557–565; De Smaele, T.; Moens, L.; Dams, R.; Sandra, P. *LC GC Int.*0 1996, 9, 138–140, 142; Pobozy, E.; Wojasinska, E.; Trojanowicz, M. *J. Chromatogr., A* 1996, 736, 141–150; Tomlinson, M. J.; Wang, J.; Caruso, J. A. *J. Anal. At. Spectrom.* 1994, 9, 957–964). In addition, extraction may also be employed. Neither of these two conventional speciation methods, however, can correct for any species transformation occurring before or during measurement.

The analysis of chromium species was chosen as an example for this disclosure. SIDMS is important due to environmental measurements of Cr(VI), as well as other types. Also, only two oxidation states of chromium are predominant in environmental samples, +3 ($Cr^{3+}$) and +6 ($CrO_4^{2-}$ and $Cr_2O_7^{2-}$), thereby reducing the number of possible reactions. The reaction chemistry of each species has been explored extensively. See, generally, (Harzdorf, A. C. *Int. J. Environ. Anal. Chem.* 1987, 29, 249–261; Serfass, E. J.; Muraca, R. F. In *Chromium: Chemistry of chromium and its compounds*; Udy, M. J., Ed.; Reinhold Publishing Corporation: New York, 1956; Vol. I, pp 53–75; Weckhuysen, B. M.; Wachs, I. E.; Schoonheydt, R. A. *Chem. Rev.* 1996, 96, 3327–3349) and is known to those skilled in the art. In addition, the differentiation between Cr(VI) and Cr(III) is very important because of their vastly different toxicities. Cr(III) is a nutrient known to be important in glucose metabolism, whereas Cr(VI) is highly toxic to humans and animals, causing some types of cancer (Paustenbach, D. J.; Meyer, D. M.; Sheehan, P. J.; Lau, V. *Toxicology and Industrial Health* 1991, 7, 159–196; Nriagu, J. O.; Nieboer, E. In *Advances in Environmental Science & Technology*; Nriagu, J. O., Ed.; John Wiley & Sons: New York, 1988; Vol. 20; Burrows, D. *Chromium Metabolism and Toxicity*; CRC Press, Inc.: Boca Raton, Fla., 1983). This difference in toxicity is important for the type and cost of environmental remediation of contaminated sites. The presence of Cr(III) may require no environmental cleanup, while the presence of Cr(VI) requires remediation. The procedure of the present invention is applicable to samples containing two interconvertable species each of which may also be destroyed or increased. While this disclosure employs only two specific species, SIDMS is not restricted to the measurement of two species, nor of this specific species alone.

In spite of the foregoing prior art knowledge and procedures there remains a very real and substantial need for a method of accurate quantification of reactive species of interest which method compensates for incomplete extraction, separation, isolation, or degradation of species, as well as related inadequacies of the prior art, such as the need for a means to validate methods of unknown accuracy.

SUMMARY OF THE INVENTION

The present invention has solved the above-described problems by providing unique methodologies for solution thereto.

The method provides for quantification of one or more species contained in a sample with compensation for species conversion and incomplete separation. In one preferred embodiment, a predetermined stable isotope is converted to a speciated enriched isotope corresponding to the specie to be measured in the same. The sample containing the specie to be measured is spiked and the isotopic spiked species and the species to be measured are brought to equilibrium. All of the species are separated from the sample and isotopic ratios are determined for each specie to be measured. The isotopic ratios are then employed to mathematically deconvolute the species concentration while correcting for species conversion and/or incomplete separation. The method may be practiced on more than one specie to be measured simultaneously. The sample may be an aqueous sample, such as a species containing aqueous solution, for example, or may be a solid sample, such as a soil matrix within which one or more species are located. The method may be practiced in quantifying Cr(III) and Cr(VI) and other species that possess multiple isotopes of the metal or ligand or molecule.

Separation may be accomplished by chromatography, such as time resolution chromatography or other suitable extraction means, such as solvent stabilization or other suitable separation means. Mass spectrometry, such as an ICP mass spectrometer, or other suitable mass spectrometers, may be employed to determine the isotope ratios.

The method of the present invention may also be employed to validate traditional or other methods of speciated analysis. It also may be employed to analyze species and certify standard materials and to prepare speciated spiked standard materials.

It is an object of the present invention to provide a method of measurement of elemental, ionic, molecular or complex species using isotope spiking of species, separation, and isotope dilution fraction measurement to provide a determination of the quantity of the species of interest in the sample.

It is a further object of the invention to provide a method which will effect accurate quantification of the species of interest in spite of incomplete extraction, solubility, separation, isolation or degradation of species.

It is a further object of the present invention to provide a method for validating other methods of unknown accuracy for specific matrix types and for procedural alterations to conserve species.

It is a further object of the present invention to provide such a method that will facilitate correction for incomplete isolation of the species through the use of a tag which joins the isotope spike specie with the specie to be measured.

It is another object of the invention to provide such a method which will permit measurement and correction for phase changes, insoluble transitions and volatile forms of the species while retaining the ability to quantify the species.

It is a further object of the present invention to provide a method to effect quantitative speciated measurement of a specific species in a sample from an unknown fraction of the sample.

It is a further object of the present invention to provide such a method which permits species conversion and corrects for these conversions.

It is a further object of the present invention to provide such a method which not only corrects for species conversions, but improves the precision and detection limits of the measurement.

It is yet another object of the present invention to provide such a method which will permit accurate quantification of the reactive species of interest from a sample despite conversion during the measurement, manipulation, storage or sampling thereof.

It is another object to provide a method to encode standards to permit their use after significant degradation of the species by correcting for the degradation by making SIDMS measurements and correcting the species remaining to their new current ratios and concentrations.

It is another object to permit the manufacturing of speciated standards that have been previously spiked with separated stable isotopes in speciated form that permit the use of these standards subsequently after storage and possible degradation.

It is another object to permit the evaluation of species in standards by evaluation by means of SIDMS to verify the current integrity of these standards as to the current concentration of a single or multiple species.

It is a further object of the present invention to provide such methods which may be employed in validation of other methods of speciated analysis which may be employable with the methods of the present invention.

It is yet another object of the invention to provide methods of analyzing species to permit certification of standard materials including speciated spiked standard materials.

These and other objects of the invention will be more fully understood from the following description of the invention on reference to the illustrations appended hereto.

DESCRIPTION OF THE PREFERRED EMBODIMENTS

Figure 1A:
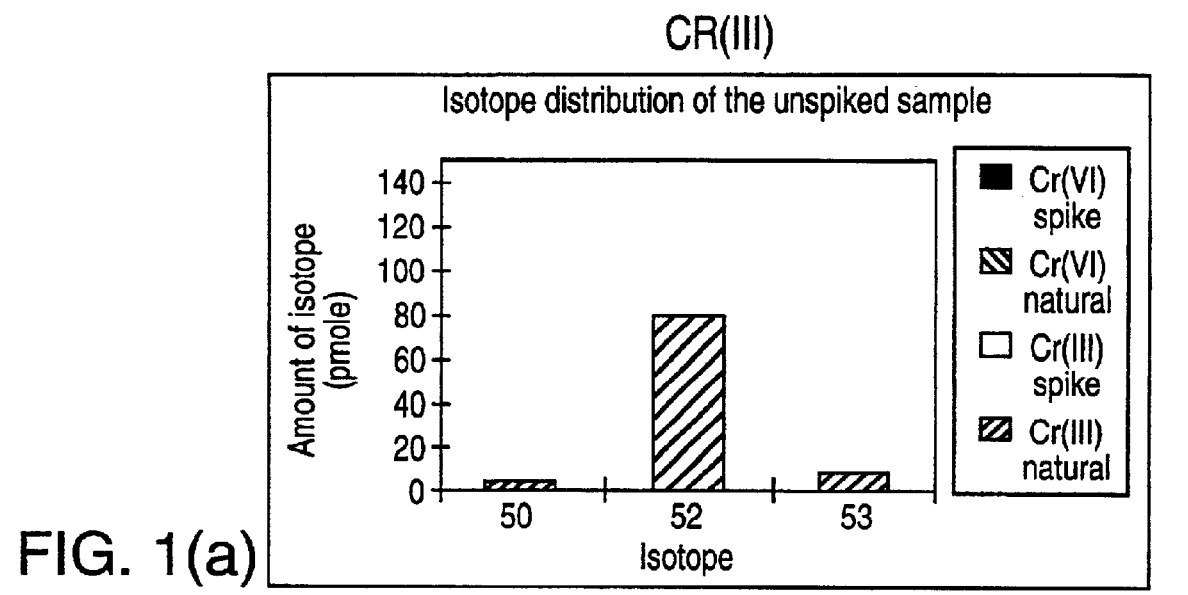
FIGS. 1(a)–1(f) are plots of the identity of a isotope versus the amount of the isotope for simultaneous determination of Cr(III) and Cr(VI).
Figure 1C:
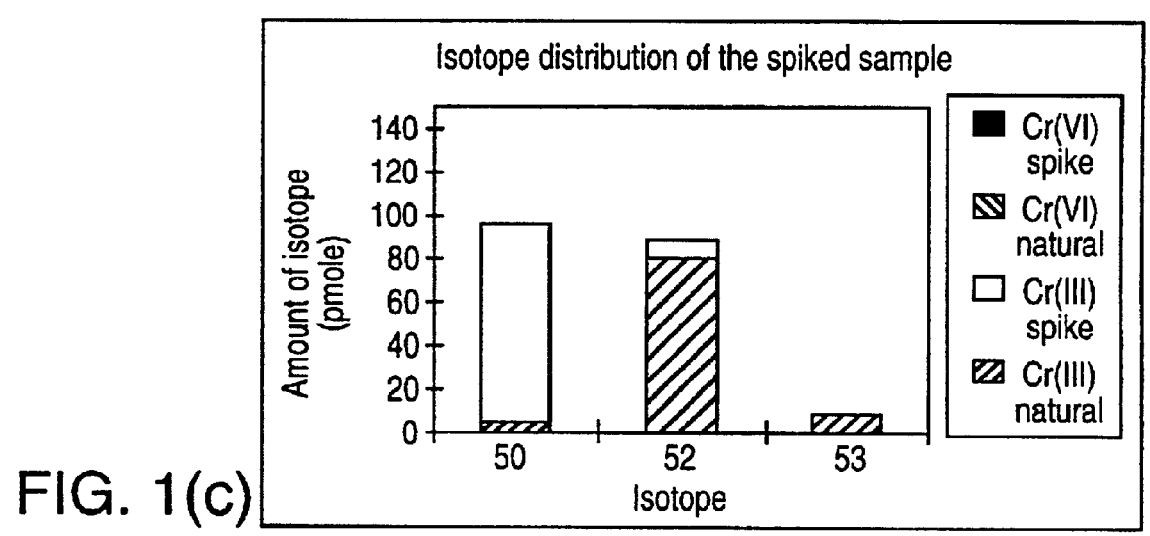

As used herein, "specie(s)" as employed in respect of the sample containing the specie which is to be analyzed quantitatively, shall refer to elemental species, ionic species, molecular species, chelated species, complex species, such as organometallic species and other species which are adapted to chemical quantitative specie at an analysis of the present invention.

As used herein, the term "isotopic element specie ratio" or "isotope ratio" shall refer to an isotopic ratio of a "species."

The present invention provides an improvement over my prior U.S. Pat. No. 5,414,259, Speciated Isotope Dilution Mass Spectrometry (SIDMS), the disclosure of which is expressly incorporated herein by reference. SIDMS provides new methods permit making these measurements with an accuracy, replicability, and defensibility currently beyond the capability of traditional metrology methods. In contrast to traditional methods that attempt to prevent the species from changing during analysis, SIDMS permits the reactions that transform species to occur and mathematically corrects for these transformations. This method also is a diagnostic tool to evaluate species transformations in more traditional methods, permitting their evaluation and validation. This new approach is being developed as a first EPA Reference Method 6800 to be published as (SW-846 EPA Method 6800: Elemental and Speciated Isotope Dilution Mass Spectrometry, *Test Methods for Evaluating Solid Waste, Update* 4; 1998). To illustrate the present invention's SIDMS method of analysis and improved validation efficiency and standards concepts, examples of the simultaneous determination of Cr(III) and Cr(VI) in water, chromite ore process residues (COPR), and soil extracts will be disclosed. While many species separation methods and mass spectrometers are applicable to SIDMS, for convenience of disclosure, the use of ion-exchange chromatography to separate Cr(III) and Cr(VI) species, and inductively coupled plasma mass spectrometry (ICP-MS) to measure the isotope ratios for demonstration will be considered, as well as microwave extractions. The ready accessibility of ICP-MS makes this method available to a great number of analytical laboratories.

Traditional isotope dilution is based on the addition of a known amount of enriched isotope to a sample. Equilibration of the spiked isotope with the natural element in the sample alters the measured isotope ratio. The concentration of the element can be calculated using the known isotopic abundances of both spike and natural, the amount of the spike added to the sample, and the altered isotopic abundance after equilibrium which usually includes destruction of all species. The equation for conventional IDMS (isolation dilution mass spectrometry) is shown as follows:

$$R_M = \frac{A_x C_x W_x + A_s C_s W_s}{B_x C_x W_x + B_s C_s W_s} \quad (1)$$

where, $R_M$ is the measured isotope ratio of isotope A to isotope B;

$A_x$ and $B_x$ are the atomic fractions of isotopes A and B in the sample;

$A_s$ and $B_s$ are the atomic fractions of isotopes A and B in the spike;

$C_x$ and $C_s$ are the concentrations of the element in the sample and spike, respectively;

$W_x$ and $W_s$ are the weights of the sample and spike, respectively. By rearranging Equation 1, the concentration of the sample can be calculated as:

$$C_x = \left(\frac{C_s W_s}{W_x}\right)\left(\frac{A_s - R_M B_s}{R_M B_x - A_x}\right) \quad (2)$$

IDMS has proven to be a highly accurate technique for the determination of total metals in various matrices (Lagerwaard, A.; Woittiez, J. R. W.; de Goeij, J. J. M. *Fresenius' J. Anal. Chem.* 1995, 351, 786–789; Van Raaphorst, J. G.; Haremaker, H. M.; Deurloo, P. A.; Beemsterboer, B. *Anal. Chim. Acta* 1994, 286, 291–296; Fassett, J. D.; Paulsen, P. J. *Anal. Chem.* 1989, 61, 643a–644a, 646a, 648a–649a). It has several advantages over other calibration methodologies. Partial loss of the analyte after equilibration of the spike and the sample will not influence the accuracy of the measurement. Fewer physical and chemical interferences influence the determination because they have essentially identical effects on all isotopes of the same element. The isotope ratio, the primary parameter to be measured for quantification in IDMS, can be measured with high precision, typically the relative standard deviation (RSD)≦0.5% on an ICP-MS. Other corrections such as mass bias and deadtime correction can be measured and corrected for. In general biases in mass spectrometry are measurable and predictable and in some mass spectrometers mass ratios can be measured within 1 part in 10,000 accuracy for such instruments as a Thermal Ionization Mass Spectrometer (TIMS). Therefore, IDMS is regarded as a "definitive" analysis method. It is a primary method used in the certification of Standard Reference Materials (SRM) and atomic weight determinations due to its high accuracy and definitive measurement capability (Moore, L. J.; Kingston, H. M.; Murphy, T. J.; Paulsen, P. J. *Environ. International* 1984, 10, 169–173). This method is also a part of EPA Method 6800 to determine total elemental concentration. This EPA method is planned to be published by the U.S. Government Printing Office in 1998.

The SIDMS method of the present invention employs a unique approach to speciation analysis that differs from traditional speciation methods. Traditional speciation methods attempt to hold each species static while making the measurement known. Speciation extraction, isolation and analysis methods, however, inherently measure the species after conversions have occurred. SIDMS has been developed to address the correction for the species conversions, which cannot be achieved by other known methods. In SIDMS, each species is "labeled" with a different isotope-enriched spike in the corresponding species form. Thus the conversions that occur after spiking are traceable and can be corrected mathematically. While SIDMS maintains such advantages of IDMS as less physical and chemical interference, it is additionally capable of correcting for either the degradation of the species or the conversion between the species. As a diagnostic tool, SIDMS also permits the evaluation of species-altering procedures and permits evaluation and validation of other more traditional speciation analysis methods. See my U.S. Pat. No. 5,414,259.

Using speciated IDMS, the sample can be spiked with one or more separated isotopes that have been chemically converted into a single species which is one main difference between SIDMS and conventional IDMS. The spikes are then equilibrated with the naturally-occurring reactive species and extracted or separated by other means from the sample material at the same time as the naturally-occurring species. Selected naturally occurring species is labeled with different highly-enriched isotope of the same element. The isotope-enriched species is chemically indistinguishable from the same "natural" species. Once equilibrated, they both undergo the same reactions. A conventional separation method, such as extraction or chromatography, is used to separate the species. Traditionally, each species is completely separated from the other and isolated in an independent solution. Isotope ratios are evaluated for each species, across the chromatographic peak to determine the extent of crossover between the various species in the time between spiking and analysis. It is possible, therefore, to correct for degradation of the species, or interchange from different species, at each step in the sampling and analysis procedure. This allows for accurate back calculation of the original sample concentration(s) of the different chemical species, a correction previously could not be made. My U.S. Pat. No. 5,414,259 discloses a study in which evaluations were performed without employing speciated isotope dilution. The patent also discloses correction for species transformation.

SIDMS does not require complete separation between the species. Because ICP-MS is not species-specific, unresolved species can be treated the same as those that have been converted to another species. Therefore, the same procedures and equations developed to correct for species conversion may be employed to correct for incomplete separation as in incomplete extraction and isolation.

SIDMS has application and improved efficiency beyond the previously disclosed applications. First, it is effective in correcting incomplete separations of species in common separation methods such as extraction and chromatography. Second, it is applicable as a validation method to permit the use of other methods after they have been evaluated for bias and accuracy. Third, it is applicable as a method integrated into accurate preparation and evaluation of speciated standard materials.

The present invention provides a new application and improvement in efficiency in application of SIDMS by extension of SIDMS to correct for incomplete separation of species. SIDMS does not require complete separation between the species. Because mass spectrometers are not species specific the use of separation serves to isolate the species. Traditionally, in the prior art, both extraction and chromatography have been used. However, the efficiency in separation has not been corrected for in conjunction with the correction of degradation and conversion of the species. SIDMS has improved efficiency of the process by permitting incomplete separation of the species and also correcting for the mixing of each species in one another.

In addition, the present invention permits one to prepare a standard material with previously labeled isotope and natural to validate other methods of analysis of species. It permits the determination of bias of separate analytical procedures techniques and the bias associated with the procedure and the effect of natural materials from the matrix which cause bias in these other methods. Validation of specific other methods can be accomplished and verification of their measurements permit the use of their data where unknown bias would otherwise prevent use of these methods.

The testing for accuracy requires standard reference materials certified for species and the use of SIDMS permits both the certification of these materials and also the reevaluation of these materials after some period of time. By preparing speciated reference materials the material may be analyzed by SIDMS when certified and at some subsequent time and accuracy of the material determined using the SIDMS procedure. This permits materials that would otherwise not be accurate due to altered species composition to be used after SIDMS analysis. The accuracy would be limited to the accuracy of the isotopic ratio measurements made by the mass discrimination devise.

FIGS. 1(*a*)–1(*f*) show the isotopic abundances of both Cr(III) and Cr(VI) in a hypothetical sample. The theoretical illustration of the application of SIDMS to the simultaneous determination of Cr(III) and Cr(VI) in FIGS. 1(*a*) and 1(*b*) show the initial natural isotopic abundances of species Cr(III) and Cr(VI) in 50 $\mu$l of 200 ng/g Cr solution in which the concentrations of both Cr(III) and Cr(VI) are 100 ng/g. The sample is then double-spiked with a Cr(III) spike enriched in $^{50}$Cr and a Cr(VI) spike enriched in $^{53}$Cr transformed to the respective species prior to spiking. The altered isotope ratios can then be measured in both the Cr(III) and the Cr(VI) species. In FIGS. 1(*c*) and 1(*d*), the sample is spiked with 100 ng/g $^{50}$Cr(III) (in which $^{50}$Cr is enriched) and 100 ng/g $^{53}$Cr(VI) (in which $^{53}$Cr is enriched), and there is no conversion between Cr(III) and Cr(VI).

Figure 1E:
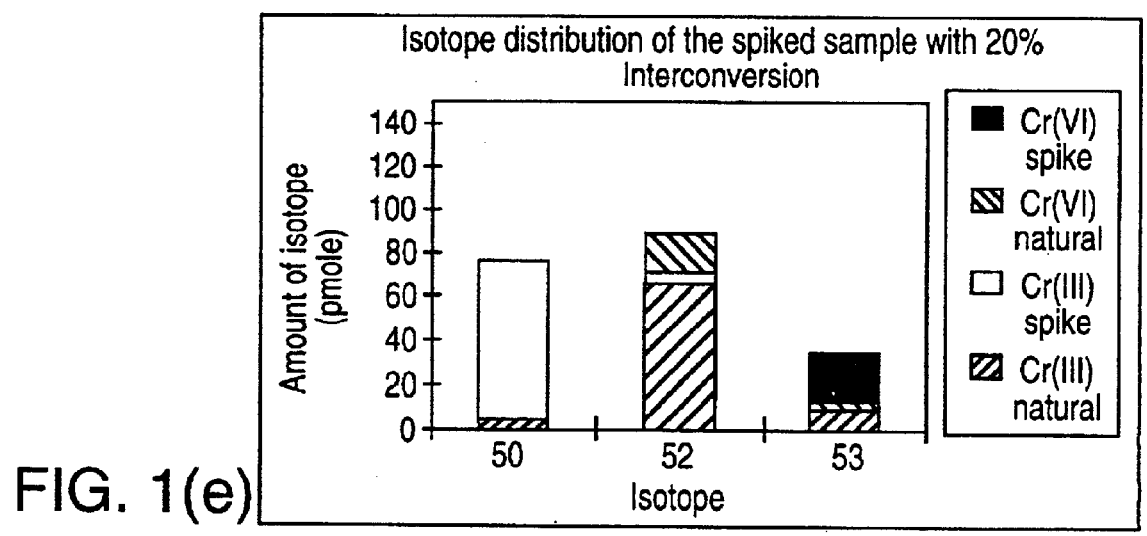
Figure 1B:
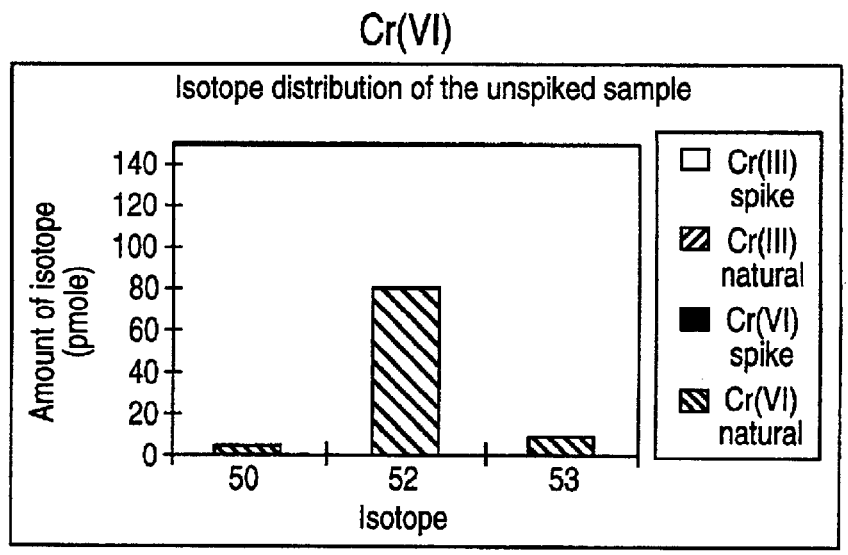
Figure 1D:
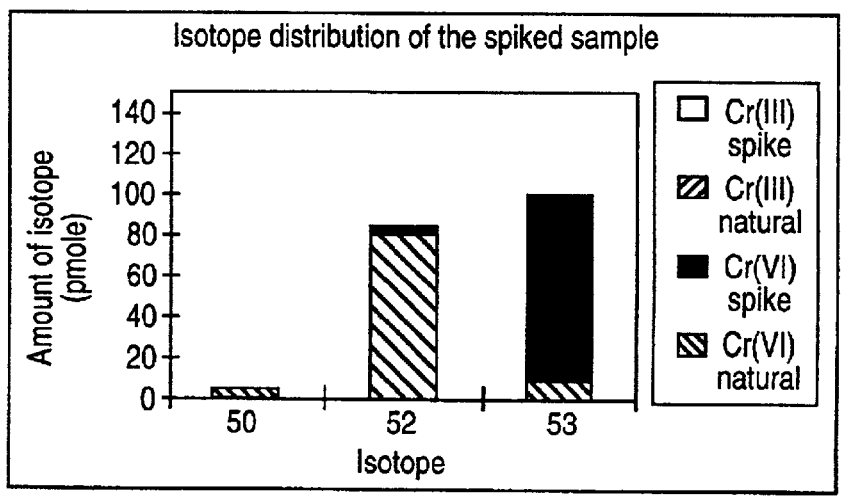
Figure 1F:
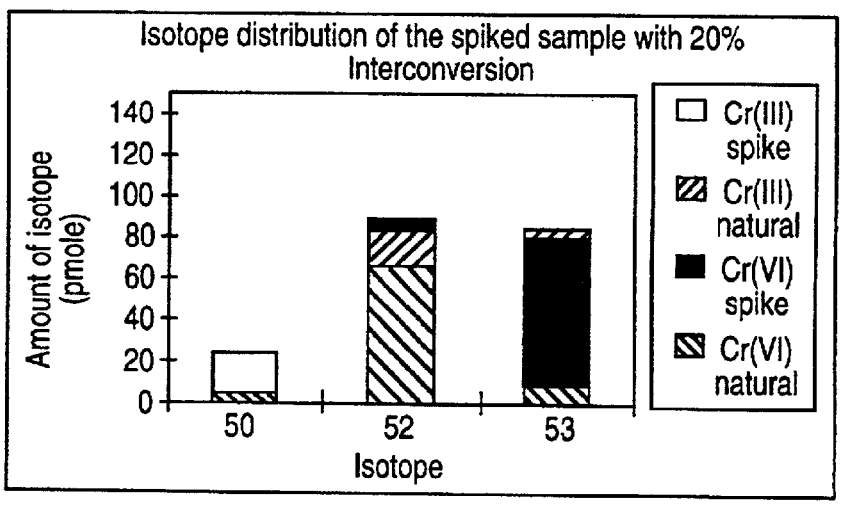

These measured isotope ratios are used in the deconvolution of the concentration of each species at the time of spiking. An example of a 20% interconversion of Cr(III) to Cr(VI) and Cr(VI) to Cr(III) is illustrated in FIG. 1(e) and FIG. 1(f), which present visual recognition of the interconversion. In FIGS. 1(e) and 1(f), 20% of Cr(III) is converted to Cr(VI) and 20% of Cr(VI) is converted to Cr(III). Different degrees of conversion result in different isotopic abundances, so the change of the relative isotopic abundances can be applied to the determination of the species and the degrees of the conversion.

In a preferred embodiment of the present invention, the process involves providing an isotopic spike for each of the natural species with respect to which a quantitative determination be made. Speciated measurements are based on transforming the enriched speciated isotope ("spike") into the same speciated form as the specie of interest. The concentration of the isotopic spike or spikes may be calibrated with the inverse isotope dilution method. The sample containing the specie or species to be evaluated may be provided in an aqueous solution. The isotopic spike or spikes are introduced into the solution and equilibration is effected. The specie or species is then separated as by chromatography or other known methods after which a mass spectrometer capable of base line resolution of isotopes may be employed to measure the isotope ratios which consist of the ratio of $^{50}Cr(III)$ to $^{52}Cr(III)$ and $^{53}Cr(VI)$ to $^{52}Cr(VI)$. The isotope measurements are made separately for each specie to be quantified. The measured isotopes may then be employed to deconvolute both the specie or species concentration and conversions. This may be accomplished mathematically.

To provide greater insight into the use of SIDMS of the present invention in connection with a determination of Cr(III) and Cr(VI) in aqueous samples will be considered.

EXAMPLE 1

Step 1. Isotopic Spike Preparation and Calibration:

Isotopic spikes for each of two species were prepared for Cr(III) and Cr(VI). A $^{50}Cr$-enriched spike for Cr(III) and a $^{53}Cr$-enriched spike for Cr(VI) were used. The concentrations of these two spikes were calibrated with inverse isotope dilution approach where natural chromium was used.

Step 2. Sample Collection and Spiking:

The aqueous sample was collected, followed by double-spiking with both $^{50}Cr(III)$ spike and $^{53}Cr(VI)$ spike. For high accuracy, spiking was done by weight using the method described in Kingston, H. M.; Pella, P. A. Anal. Chem. 1981, 53, 223–227.

Step 3. Sample Species and Spike Species Equilibration:

The sample was equilibrated with the isotopic spikes by mixing both the sample and the isotopic spikes in aqueous forms.

Figure 2A:
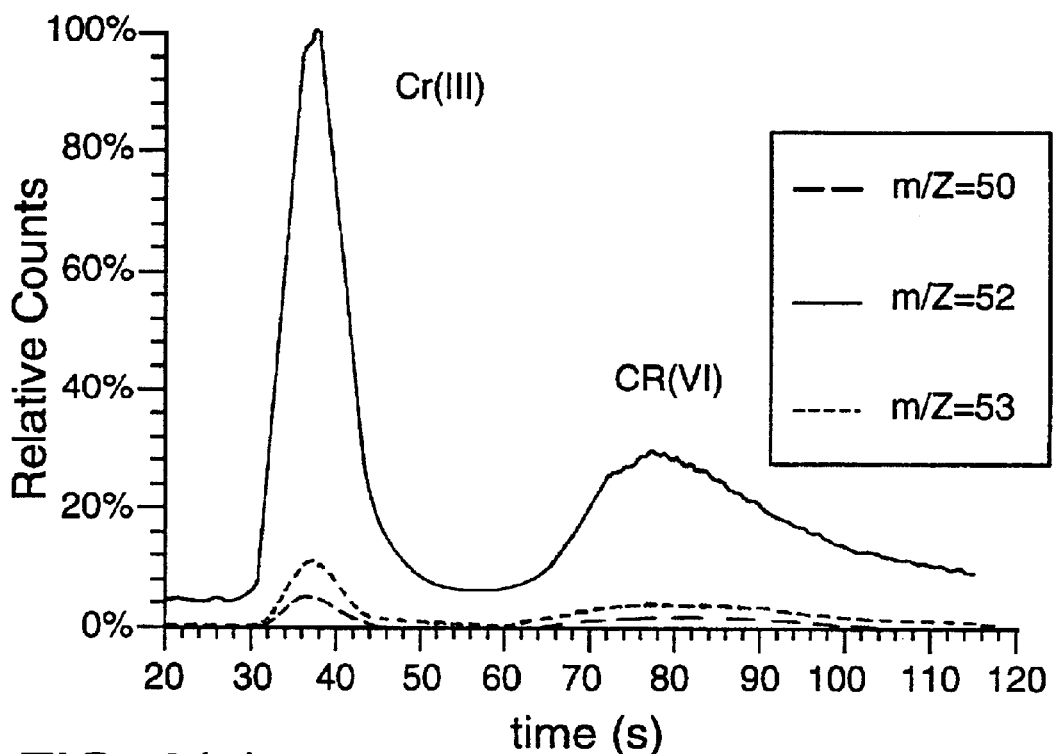
FIGS. 2(a) and 2(b) show respectively separation of the unspiked sample and isotopically-spiked sample chromatograms of a solution containing Cr(III) and Cr(VI).
Figure 2B:
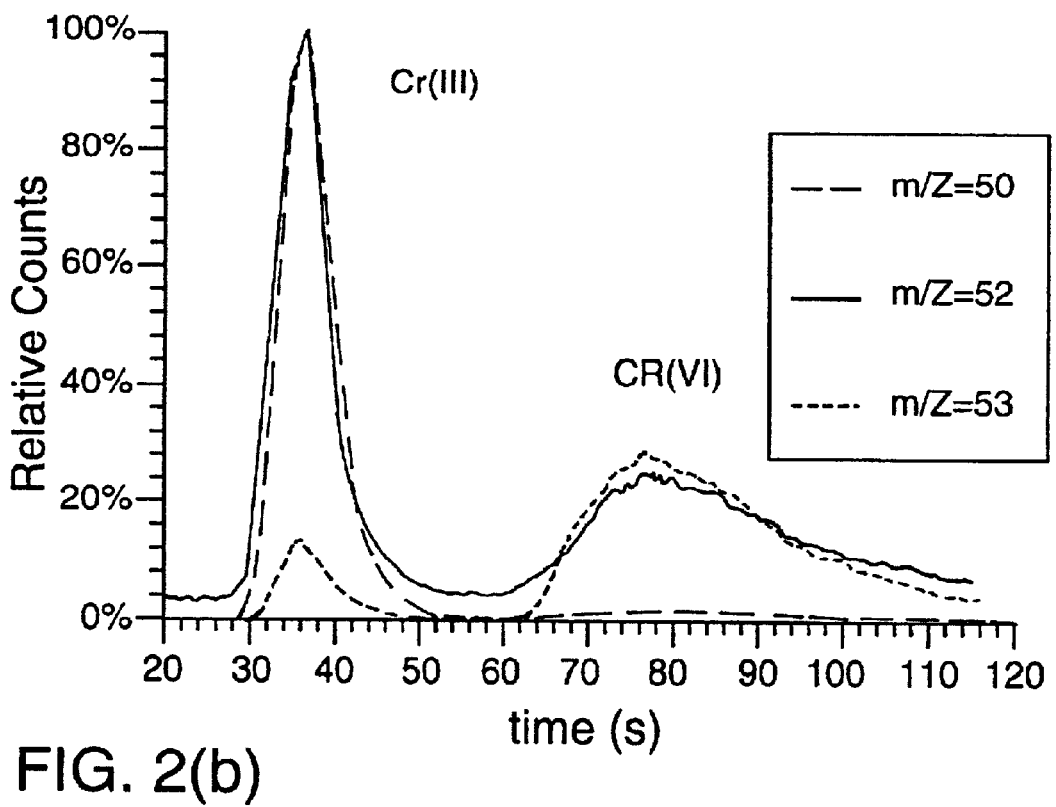

Step 4. Separation of the Species:

An anion-exchange chromatography system connected to an inductively coupled plasma mass spectrometer (ICP-MS) physically separated the Cr(III) and Cr(VI) fractions in different volumes of the eluent. FIG. 2(a) shows chromatograms of an unspiked sample and FIG. 2(b) shows chromatograms of an isotopically-spiked sample. FIG. 2(a) shows chromatograms of the solution containing Cr(III) and Cr(VI) with natural isotopic abundances and FIG. 2(b) shows chromatograms of the same solution spiked with the isotopic spikes $^{50}Cr(III)$ and $^{53}Cr(VI)$.

Step 5. Isotope Ratio Measurement of Each Speciated Component:

Each sample point on the chromatographic peaks contains the isotopic distribution of that species, allowing replicate measurements of the isotope ratios for each injection. Isotope ratio measurements were made separately for Cr(III) and for Cr(VI) through the use of an ICP-MS.

Step 6. Determination of Species Concentrations and Conversions.

The measured isotopes were employed to create the ratios and to deconvolute the species concentrations mathematically for both the species concentrations and conversions. The set of equations (3) through (6) for double-spiked SIDMS can be used to calculate definitely the concentrations of Cr(III) and Cr(VI) in the aqueous sample and the amount of conversion between Cr(III) and Cr(VI) that has occurred after spiking.

While conventional IDMS requires at least two isotopes for a species, simultaneous determination of two interconvertable species by SIDMS employs at least three isotopes. As Cr has four isotopes, this requirement was met.

Preferably, the isotopic spike is highly enriched and consists entirely of species which remains in that form upon indefinite storage.

The isotopic spike should be able to be added to the sample conveniently. For example, it may be necessary to add the isotopic spike as a solid material to the solid sample matrix. This will require homogenization of the sample prior to extraction or analysis. For aqueous samples, however, the isotopic spike can be prepared as a solution, and spiking can be done simply by mixing the sample and isotopic spike solutions.

The isotopic spike can be equilibrated with the natural species if it is in the same chemical form as the analyte. Preferably, the rate of equilibration should be much higher than the rate of the species conversions. As SIDMS can correct for species conversions that occur after equilibration between the spike and sample, equilibration should be achieved before any conversions take place.

The concentration of the natural, as compared with the isotopic spike, should be high so that the addition of the isotopic spike introduces a minimum amount of stabilizing agent which could affect the natural stability of the analyte. Preferably, means may be employed to retard species conversions. Species conversions can degrade the accuracy and precision of the determination at extreme limits, such as 95% conversion, for example.

For simultaneous determination of more than one species, it is proposed that there is no meaningful loss of the species due to side reactions other than conversions between the monitored species. In the example, we acidified solutions to prevent the loss of Cr(III) due to hydrolysis.

The species will be partially separated from the matrix and from each other to allow the isotope ratio measurement of each species. In the present invention, incomplete separations do not materially degrade the accuracy of the method.

The present invention provides for mathematical deconvolution in order to provide the desired quantitative results independently of the specimen being incomplete, lost, degraded, being insoluble, or conversions having occurred. Mathematical deconvolution will employ the measured ratio of spiked species to correct concentration of the natural species for incomplete separation, specimen loss and insolubility, degradation and conversion.

A set of equations, with four variables, permits simultaneous mathematical deconvolution of Cr(III) and Cr(VI). In addition, incomplete recovery or unresolved species from the chromatography can be treated the same as those that have been converted to another species. Therefore, the same procedures and equations are applicable to correcting for incomplete separations. This application is separately demonstrated in subsequent examples. The derivation is preferably performed under the following conditions. First, spike isotopes and natural species isotopes have been equilibrated. Second, there is no selective loss of the species that would selectively affect only one form of species, either the natural or the isotopically spiked species. Third, only the conversions are between the species of interest occur. Fourth, each isotopic spike consists entirely of one species (in this case, all Cr in the $^{50}$Cr(III) spike is Cr(III), and all Cr in the $^{53}$Cr(VI) spike is Cr(VI)). While the following equations are not the only expressions for SIDMS, they have been optimized here for the double-spiking example. Other methods may be employed.

$$R_{50/52}^{III} = \frac{(^{50}A_x C_x^{III} W_x + {}^{50}A_s^{III} C_s^{III} W_s^{III})(1-\alpha) + ({}^{50}A_x C_x^{VI} W_x + {}^{50}A_s^{VI} C_s^{VI} W_s^{VI})\beta}{(^{52}A_x C_x^{III} W_x + {}^{52}A_s^{III} C_s^{III} W_s^{III})(1-\alpha) + ({}^{52}A_x C_x^{VI} W_x + {}^{52}A_s^{VI} C_s^{VI} W_s^{VI})\beta} \quad (3)$$

$$R_{53/52}^{III} = \frac{(^{53}A_x C_x^{III} W_x + {}^{53}A_s^{III} C_s^{III} W_s^{III})(1-\alpha) + ({}^{53}A_x C_x^{VI} W_x + {}^{53}A_s^{VI} C_s^{VI} W_s^{VI})\beta}{(^{52}A_x C_x^{III} W_x + {}^{52}A_s^{III} C_s^{III} W_s^{III})(1-\alpha) + ({}^{52}A_x C_x^{VI} W_x + {}^{52}A_s^{VI} C_s^{VI} W_s^{VI})\beta} \quad (4)$$

$$R_{50/52}^{VI} = \frac{(^{50}A_x C_x^{III} W_x + {}^{50}A_s^{III} C_s^{III} W_s^{III})\alpha + ({}^{50}A_x C_x^{VI} W_x + {}^{50}A_s^{VI} C_s^{VI} W_s^{VI})(1-\beta)}{(^{52}A_x C_x^{III} W_x + {}^{52}A_s^{III} C_s^{III} W_s^{III})\alpha + ({}^{52}A_x C_x^{VI} W_x + {}^{52}A_s^{VI} C_s^{VI} W_s^{VI})(1-\beta)} \quad (5)$$

$$R_{53/52}^{VI} = \frac{(^{53}A_x C_x^{III} W_x + {}^{53}A_s^{III} C_s^{III} W_s^{III})\alpha + ({}^{53}A_x C_x^{VI} W_x + {}^{53}A_s^{VI} C_s^{VI} W_s^{VI})(1-\beta)}{(^{52}A_x C_x^{III} W_x + {}^{52}A_s^{III} C_s^{III} W_s^{III})\alpha + ({}^{52}A_x C_x^{VI} W_x + {}^{52}A_s^{VI} C_s^{VI} W_s^{VI})(1-\beta)} \quad (6)$$

where, $R_{50/52}^{III}$ is the measured isotope ratio of $^{50}$Cr to $^{52}$Cr of Cr(III) in the spiked sample $R_{53/52}^{III}$ is the measured isotope ratio of $^{53}$C to $^{52}$Cr of Cr(III) in the spiked sample.

$R_{50/52}^{VI}$ is the measured isotope ratio of $^{50}$Cr to $^{52}$Cr of Cr(VI) in the spiked sample.

$R_{53/52}^{VI}$ is the measured isotope ratio of $^{53}$Cr to $^{52}$Cr of Cr(VI) in the spiked sample.

$^{50}A_x$ is the natural atomic fraction of $^{50}$Cr in the sample $C_x^{III}$ is the concentration of Cr(III) in the sample ($\mu$mole/g, unknown)

$W_x$ is the weight of the sample in grams $^{50}A_s^{III}$ is the atomic fraction of $^{50}$Cr in the isotopic spike: $^{50}$Cr(III)

$C_s^{III}$ is the concentration of Cr(III) in the $^{50}$Cr(III) spike ($\mu$mole/g)

$W_s^{III}$ is the weight of the $^{50}$Cr(III) spike in grams $C_x^{VI}$ is the concentration of Cr(VI) in the sample ($\mu$mole/g, unknown)

$\alpha$ is the percentage of Cr(III) oxidized to Cr(VI) after spiking (unknown)

$\beta$ is the percentage of Cr(VI) reduced to Cr(III) after spiking (unknown)

Those skilled in the art will be able to solve the equations for $C_x^{III}$, $C_x^{VI}$, $\alpha$ and $\beta$. A spreadsheet, such as Microsoft (MS) Excel may be employed advantageously in solving this set of equations.

A mathematical means to solve the equations iteratively involves the following:

To simplify Equations 3–6, let:

$$C_x^{III} W_x = N_x^{III}, \ C_x^{VI} W_x^{VI} = N_x^{VI}, \ C_s^{III} W_s = N_s^{III}, \ C_s^{VI} W_s = N_s^{VI} \quad (7)$$

At the beginning of the iteration, arbitrary values may be assigned to $N_x^{VI}$ and $\alpha$. For example, both of them are assigned as 0s. Next the expression of $N_x^{III}$ and $\beta$ is determined. After careful derivation, the following equations are obtained.

$$(1-\alpha)(R_{50/52}^{III}({}^{52}A_x - {}^{50}A_x)N_x^{III} + [R_{50/52}^{III}$$
$$({}^{52}A_x N_x^{VI} + {}^{52}A_s^{VI}$$
$$N_s^{VI}) - ({}^{50}A_x N_x^{VI}$$
$$+{}^{50}A_s N_s^{VI})]\beta =$$
$$(R_{50/52}^{III}({}^{52}A_s^{III} + {}^{50}$$
$$A_s^{III}(N_s^{III})1-\alpha) \quad (8)$$

$$(1-\alpha)(R_{53/52}^{III}({}^{52}A_x - {}^{53}A_x)N_x^{III} + [R_{53/52}^{III}({}^{52}$$
$$A_x N_x^{VI} + {}^{52}A_s^{VI}$$
$$N_s^{VI}) - ({}^{53}A_x N_x^{VI}$$
$$+{}^{53}A_s N_s^{VI})]\beta =$$
$$(R_{53/52}^{III}({}^{52}A_s^{III} + {}^{53}$$
$$A_s^{III})N_s^{III}(1-\alpha) \quad (9)$$

Equations 8 and 9 are rewritten as:

$$A_1 N_x^{III} + B_1 \beta = C_1 \quad (10)$$

$$A_2 N_x^{III} + B_2 \beta = C_2 \quad (11)$$

The solutions are:

$$N_x^{III} = \frac{\begin{vmatrix} C_1 & B_1 \\ C_2 & B_2 \end{vmatrix}}{\begin{vmatrix} A_1 & B_1 \\ A_2 & B_2 \end{vmatrix}} \text{ and } \beta = \frac{\begin{vmatrix} A_1 & C_1 \\ A_2 & C_2 \end{vmatrix}}{\begin{vmatrix} A_1 & B_1 \\ A_2 & B_2 \end{vmatrix}} \quad (12)$$

These two values can be used in the following to solve for $N_x^{VI}$ and $\alpha$:

$$(1-\beta)(R_{50/52}^{VI}{}^{52}A_x - {}^{50}$$
$$A_x)N_x^{VI} + [R_{50/52}^{VI}({}^{52}$$
$$A_x N_x^{III} + {}^{52}A_s^{III} N_s^{III})$$
$$-({}^{50}A_x N_x^{III} + {}^{50}A_s$$
$$N_s^{III})]\alpha = (R_{50/52}^{VI}{}^{52}A_s^{VI}$$
$$+{}^{50}A_s^{VI})(N_s^{VI})1-\beta) \quad (13)$$

$$(1-\beta)(R_{53/52}^{VI}{}^{52}A_x$$
$$-{}^{53}A_x)N_x^{VI} + [R_{53/52}^{VI}$$

$$(^{52}A_x N_x^{III} + ^{52}A_S^{III}$$

$$N_S^{III}) - (^{53}A_x N_x^{III}$$

$$+ ^{53}A_S^{III} N_S^{III})]\alpha$$

$$= (R_{53/52}^{VI}\ ^{52}A_S^{VI} + ^{53}$$

$$A_S^{VI}) N_S^{VI}(1-\beta) \qquad (14)$$

Equations 13 and 14 are rewritten as:

$$A_3 N_x^{VI} + B_3 \alpha = C_3 \qquad (15)$$

$$A_4 N_x^{VI} + B_4 \alpha = C_4 \qquad (16)$$

The solutions to Equations 15 and 16 are given by:

$$N_x^{VI} = \frac{\begin{vmatrix} C_3 & B_3 \\ C_4 & B_4 \end{vmatrix}}{\begin{vmatrix} A_3 & B_3 \\ A_3 & B_3 \end{vmatrix}} \text{ and } \alpha = \frac{\begin{vmatrix} A_3 & C_3 \\ A_4 & C_4 \end{vmatrix}}{\begin{vmatrix} A_3 & B_3 \\ A_4 & B_4 \end{vmatrix}} \qquad (17)$$

As the calculation is repeated, the variables $N_x^{III}$, $N_x^{VI}$, $\alpha$ and $\beta$ will converge to constant values, and these values are the solutions of the equations.

The SIDMS method of the present invention involves spiking each species with different-isotope-enriched spikes. As a result, the isotope dilution method disclosed herein is fundamentally different from those previous papers which applied the IDMS to speciation (Van Raaphorst, J. G.; Haremaker, H. M.; Deurloo, P. A.; Beemsterboer, B. *Anal. Chim. Acta* 1994, 286, 291–296; Tanzer, D.; Heumann, K. G. *Anal. Chem.* 1991, 63, 1984–1989; Heumann, K. G.; Rottnanm, L.; Vogl, J. J. *Anal. At. Spectrom.* 1994, 9, 1351–1355; Nusko, R.; Heumann, K. G. *Anal. Chim. Acta* 1994, 286, 283–290). In those papers, different species were spiked with the same isotope-enriched material in the corresponding species forms, and the conventional IDMS equation was used in the calculation of the concentration from the measured isotope ratio of each species. Although the precision and detection limits were improved by applying the isotope dilution technique, those earlier methods cannot correct for conversions between the species. The method of the present invention, however, has the capability of correcting for the species conversions and incomplete separation in addition to improving the precision and detection limits. The method of this invention permits the species conversion and can correct for such conversions, degradation, and incomplete separations.

The following articles are of interest in respect of organic IDMS and organic determinations employing C-13 and N-15 isotopically labeled traces, but without determination of species conversions: George N. Bowers, Jr; John D. Fassett; Edward White, V, "Isotope Dilution Mass Spectrometry and the National Reference System" Analytical Chemistry, Vol. 65. No. 12, Jun. 15, pgs. 475R–479R, 1993; Michael J. Welch, Alex Cohen, Harry S. Hertz, Kwokei J. Ng, Rober Schaffer, Pieter Van Der Lijn, and Edward White V, "Determination of Serum Creatinine by Isotope Dilution Mass Spectrometry as a Candidate Definitive Method", Analytical Chemistry, 58, pgs. 1681–1685, 1986; Polly Ellerbe, Alex Cohen, Michael J. Welch, and Edward White V, "Determination of Serum Uric Acid by Isotope Dilution Mass Spectrometry as a New Candidate Definitive Method", Analytical Chemistry, 62, pgs. 2173–2177, 1990; Polly Ellerbe, Stanley Meiselman, Lorna T. Sniegoski, Michael J. Welch, and Eward White V, "Determination of serum Cholesterol by a Modification of the Isotope Dilution Mass Spectrometric Definitive, Method" Analytical Chemistry, 61, pgs. 1718–1723, 1989.

Additional examples applying the methods of the present invention with various samples such as synthetic water samples, drinking water, river water, COPR extracts, and soil extracts are provided. Depending on the matrix, the analysis process may be adjusted to optimize the performance, precision, and accuracy of the method for all matrix types.

EXAMPLE 2

The method was employed with an inductively coupled plasma mass spectrometry (ICP-MS). A VG PlasmaQuad system (VG, Winford, UK) equipped with a water-cooled spray chamber and v-groove nebulizer was employed. A continuous dynode multiplier was used as a detector. The instrument was operated under the following conditions: plasma forward power, 1347 W; coolant gas flow rate, 12.5 L/min; auxiliary gas flow rate, 2.0 L/min; nebulizer flow rate, 0.71 L/min; solution uptake rate, 1 mL/min. The mass spectrometer was set to baseline resolution. Chromium isotope ratios $^{50}Cr/^{52}Cr$ and $^{53}Cr/^{52}Cr$ were measured using peak jumping mode. The instrument worked in two modes: the direct aspiration mode and the Time-Resolved Mode (TRA). The dwell times of each channel for direct aspiration were: $^{50}Cr$, 5 ms; $^{52}Cr$, 5 ms; and $^{53}Cr$, 5 ms; the short dwell time can improve the precision of the isotope ratio measurement (Begley, I. S.; Sharp, B., L. *J. Anal. Atom. Spectrom.* 1994, 9, 171–176). For the TRA mode, the sweep time per slice was 0.057 s, and the corresponding dwell time per channel was 5.7 ms. Direct aspiration mode was used to measure the deadtime and to quantify the total concentrations of the isotopic spikes. TRA mode was used when the chromatography was connected to the ICP-MS. Three points per peak were monitored for both the direct aspiration mode and the TRA mode.

Deadtime correction is performed in isotope ratio measurement (Russ, G. P., III; Bazan, J. M. *Spectrochim. Acta*, Part B 1987, 42b, 49–62; Russ, G. P. I. In *Applications of ICP-MS*; Jarvis, K. E., Gray, A. L., Houk, R. S., Eds., 1992, pp 90–114). Using the direct aspiration mode, the detector's deadtime was determined daily. A set of solutions with different concentrations of Cr from SRM 979, an isotopic-abundance-certified standard $(Cr(NO_3)_3 \cdot 9H_2O$, NIST, Gaithersburg, Md.) were prepared. The solutions contained approximately 0, 5, 10, 20, 30, 40, 50, 60, and 70 ng Cr per g solution, respectively. The raw data was exported to and processed in the MS Excel worksheet employing the "Solver" tool in MS Excel to find the correct deadtime. The apparent deadtime which brought the isotope ratios measured with solutions of different concentrations to a constant was found. In practice, the RSD of the measured isotope ratios with different concentrations reached a minimum. Deadtime correction and mass bias correction were performed in isotope ratio measurements and were done according to standard methods. (Russ, G. P., III; Bazan, J. M.; Spectrochim. Acta, Part B, 42b, 49–62, 1987; Jarvis, K.

Figure 3:
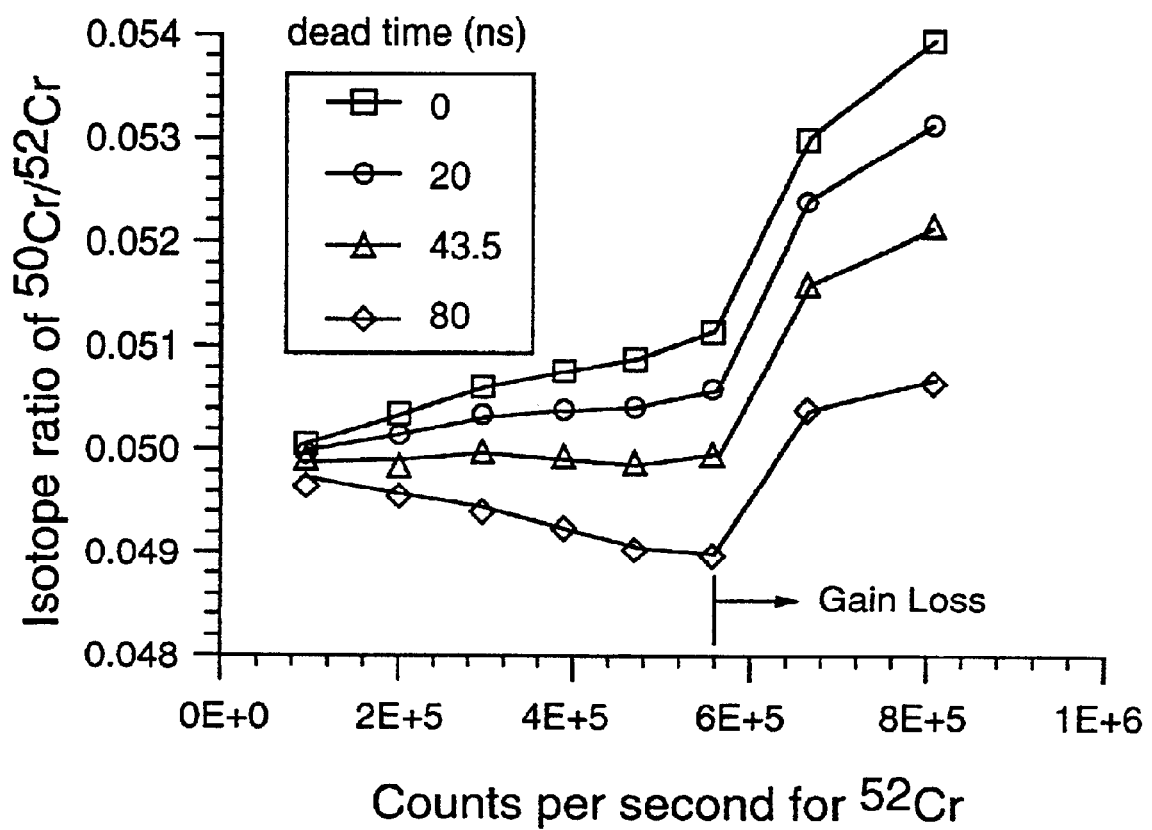
FIG. 3 is a plot showing the influence of deadtime correction on the isotope ratios measured with mass spectrometry.

E.; Gray, A. L.; Houk, R. S. In handbook of inductively coupled plasma mass spectrometry; Blakie Academic & Professional: London, 1992, pp 310–337.) The isotope ratios were employed to determine the count rate range within which the gain loss would not occur. As shown in FIG. 3, which displays the $^{50}Cr/^{52}Cr$ ratios as a function of the count rate, the measured isotope ratios depended on the deadtime. In FIG. 3, the influence of the deadtime correction on the isotope ratios measured with ICP-MS equipped with a continuous dynode multiplier. Gain loss occurs when the count rate exceeds $5.8\times10^5$ s$^{-1}$. When the deadtime was 43.5 ns, the isotope ratios were brought to a constant, up to the count rate of $5.8\times10^5$ s$^{-1}$. At this count rate, uncorrectable gain loss begins to occur. Sample solutions were diluted if the count rate was higher than this value.

The mass bias factors were determined for each isotope pair with SRM979 standard solutions every four hours. The measurement of mass bias factors was always done in the same mode in which the sample was measured. The deadtime correction was performed before mass bias correction.

Ion Chromatography

A CostaMetric 4100Bio/MS pump (Thermo Separation Products, Riviera Beach, Fla.) and a Cetac ANX 4605 Cr anion-exchange column (CETAC Corporation, Omaha, Nebr.) were used to separate Cr(III) and Cr(VI) by ion chromatography. The outlet of the column was connected to the nebulizer of the ICP-MS with a piece of Teflon tubing. The 0.06M nitrate eluent was prepared from the subboiled distilled concentrated nitric acid. The pH of the eluent was adjusted to 3 with the purified concentrated ammonium hydroxide. The flow rate was 1.0 mL/min. A 50 µL symbol sample loop was used for sample injection. Peak areas were calculated after the deadtime correction at each point. The deadtime-corrected peak areas were used to calculate the isotope ratios. The isotope ratios were then mass bias corrected.

Extraction was done in Teflon vessels on both hot-plate and in closed vessel microwave extraction systems. The hot-plates were standard laboratory units (Fisher Scientific, Pittsburgh Pa.) and microwave extraction was accomplished in a specially equipped closed vessels digestion/extractions system equipped with stirring (Milestone, Inc., Monro, Conn.). Both laboratory clean (class 100) air and argon and nitrogen environments were used in the extraction of chromium.

Reagents and Materials

Deionized water (18 MΩ cm$^{-1}$) prepared from a Barnstead's NANOpure Ultrapure Water System (Dubuque, Iowa) was used in the preparation of all solutions.

Subboiled nitric acid was prepared from quartz stills (Milestone, Sorisole(BG), Italy) and was used to prepare the eluent. Ammonium hydroxide was prepared by bubbling high purity ammonium gas through high purity water. KMnO$_4$ solution containing approximately 10 µg Mn per g solution was prepared by dissolving KMnO$_4$ in deionized water. In addition, five standards were prepared, including $^{nat}Cr(III)$ and $^{nat}Cr(VI)$ with natural isotopic abundances, $^{50}Cr(III)$ isotopic spike enriched in $^{50}Cr$, $^{53}Cr(VI)$ isotopic spike enriched in $^{53}Cr$, and an isotopic-abundance-certified Cr standard solution. The preparation and dilution of all solutions were performed in Class 100 clean room or clean hoods to reduce blank (Kingston, H. M.; Walter, P. J.; Chalk, S.; Lorentzen, E.; Link, D. In *Microwave-Enhanced Chemistry: Fundamentals, Sample Preparations and Applications*; Kingston, H. M., Haswell, S. J., Eds.; American Chemical Society: Washington, D.C., 1997, pp 257–279).

The $^{nat}Cr(III)$ standard solution was prepared from Cr metal (99.995%, Aldrich Chemical Co., Milwaukee, Wis.), and the $^{nat}Cr(VI)$ standard solution was prepared from K$_2$Cr$_2$O$_7$ (NIST SRM 136e, Gaithersburg, Md.). The $^{nat}Cr$(III) standard stock solution containing 1 mg of Cr per g of solution was prepared by dissolving 0.1000 g of Cr metal in a minimum amount of 6 M HCl. The solution was diluted with 1% HNO$_3$ to 100 g. The $^{nat}Cr(VI)$ standard stock solution containing 1 mg of Cr per g of solution was prepared by dissolving 0.2829 g K$_2$Cr$_2$O$_7$ in approximately 80 mL of deionized water and diluting to 100 g with deionized water.

Isotope-enriched materials were purchased from Isotec Inc. (Miamisburg, Ohio). Table 1 lists the analyzed isotopic abundances of both $^{50}Cr$ enriched metal and $^{53}Cr$ enriched oxide.

TABLE 1

Isotopic Abundance of Chromium for Natural and Isotope-enriched Material

| Natural Isotopic Abundance $^{nat}Cr(III)$ and $^{nat}Cr(VI)$ | | $^{50}Cr^a$ Enriched Metal $^{50}Cr(III)$ spike | | $^{53}Cr^b$ Enriched Oxide $^{53}Cr(VI)$ spike | |
|---|---|---|---|---|---|
| 50 | 4.35% | 50 | 93.1% | 50 | 0.03% |
| 52 | 83.79% | 52 | 6.8% | 52 | 2.19% |
| 53 | 9.50% | 53 | 0.1% | 53 | 97.7% |
| 54 | 2.36% | 54 | 0% | 54 | 0.08% |

$^a$Isotec Inc. Lot #2691.
$^b$Isotec Inc. Lot #2692

The $^{50}Cr(III)$ isotopic spike containing approximately 10 µg of Cr per g of solution was prepared using chromium metal enriched in $^{50}Cr$ (Lot #2691, Isotec Inc., Miamisburg, Ohio) as the source material. Four mg of the metal was weighted into a 30 mL Teflon vessel, and 8 mL of 6 M HCl were added. The vessel was gently heated on the hot plate until the solid was dissolved and only 1 to 2 µL of the solution remained. The solution was then cooled and transferred to a 500 mL Teflon bottle. The solution was diluted with 1% HNO$_3$ to 400 g. The exact concentration of the $^{50}Cr(III)$ spike was calibrated by inverse isotope dilution.

The $^{53}Cr(VI)$ isotopic spike containing approximately 10 µg of Cr per g of solution was prepared using chromium oxide enriched in $^{53}Cr$ (Lot #2691, Isotec Inc., Miamisburg, Ohio) as the source material. Using a 30 mL Teflon vessel with a vented cap, 5.8 mg of $^{53}Cr$ enriched oxide was weighted into the vessel and 8 mL of concentrated HClO$_4$ (67–70%, Optima) was added. The vessel was slowly heated on a hot plate until bubbles formed on the bottom. The solution was heated for up to six hours until all solid were dissolved and only 1 to 2 mL of the solution remained. After the solution cooled, 10 mL of deionized water were added, followed by the addition of 50 µL of 30% H$_2$O$_2$ and 4.5 mL of concentrated NH$_4$OH. The vessel was again slowly heated until the solution boiled, oxidizing all Cr to Cr(VI). The solution was then boiled for 20 minutes to remove the excess H$_2$O$_2$. The cooled solution was then transferred to a 500 mL Teflon bottle and diluted with deionized water to 400 g. The exact concentration of the $^{53}$Cr(VI) spike was calibrated by inverse isotope dilution.

The isotopic-abundance-certified standard (1 g of solution contained about 10 µg of Cr) was prepared by dissolving 31 mg of Cr(NO$_3$)$_3$.9H$_2$O (SRM979) in 1% HNO$_3$ in a 500 mL Teflon bottle.

Calibration of the $^{50}$Cr(M) and $^{53}$Cr(VI) Spike Solutions by Inverse Isotope Dilution Isotopic spike solutions were characterized before using, including the determination of the total concentration and the distribution between the species. The total concentrations of Cr in both $^{50}$Cr(III) and $^{53}$Cr(VI) spikes were calibrated with $^{nat}$Cr(VI) standard solution by inverse conventional isotope dilution mass spectrometry. No further characterization was required for $^{50}$Cr(III) because all Cr in this solution was in Cr(III) form. As multiple steps were involved in the preparation of the $^{53}$Cr(VI) spike, the completeness of the conversion of Cr(III) to Cr(VI) was verified experimentally.

To calibrate the concentration of Cr(VI) in the $^{53}$Cr(VI) spike, 0.3 g of 10 µg/g $^{nat}$Cr(VI) standard and 0.3 g of the $^{53}$Cr(VI) spike (nominal concentration of 10 µg/g) were weighted into a polyethylene bottle. The mixture was then diluted to 20 g with deionized water and 70 µL of concentrated HNO$_3$ was used to acidify the solution to pH 1.7. The acidified solution was separated chromatographically into Cr(III) and Cr(VI). The isotope ratio of $^{53}$Cr/$^{52}$Cr in the Cr(VI) species was measured and used in the calculation of Cr(VI) concentration by employing inverse conventional isotope dilution. Experimental results verified that all Cr in $^{53}$Cr(VI) standard was in Cr(VI) form.

The following solutions were used in the standard EPA RCRA Method 3060A to extract Cr(VI) from soil matrices. The extract solution was made up by dissolving 20 g of NaOH (98%) and 30 g anhydrous Na$_2$CO$_3$ (99.6%) in 500 mL of deionized water and then diluting to 1 L.

Natural Water Sample Collection and Analysis

A sample of river water from the Allegheny River in Pittsburgh, Pa., was collected and analyzed. Tap water was collected from the Duquesne University laboratory. Samples used for recovery determination were spiked with $^{nat}$Cr(VI). All samples were then isotopically spiked with $^{53}$Cr(VI) and $^{50}$Cr(III) and acidified to pH 1.7 to 2.0. Samples were filtered through 0.2 µm nylon filter membranes (Alltech, Deerfield, Ill.) before injection. Samples were analyzed before and after filtering to evaluate the conversion caused by this step in the process.

Environmental Solids Analysis

Chromite Ore Processing Residue (COPR) samples were provided by Environmental Standards, Inc. (Valley Forge, Pa.). Soil samples were collected from the yard of a residence in Pittsburgh, Pa. Extractions were performed on the hot-plate and employing microwave closed vessel systems. Method 3060A was followed to extract Cr(VI): 2.5±0.5 g of each solid sample was weighted into 250 mL glass beakers and 50 mL of the 0.28 M Na$_2$CO3/0.5 M NaOH extraction solution was added. Before extraction, samples were stirred for five minutes without heating. The samples were then heated to 90–95° C. and stirred for one hour. After cooling, the extract solution was filtered through a 0.4 µm polycarbonate membrane (Poretics Co., Livermore, Calif.) and adjusted to pH 7.5±0.5 using concentrated nitric acid. A Teflon filter assembly (Norton Co.) was used to filter the samples. Extracts were then transferred to 100 mL polypropylene volumetric flasks (Nalgene) and diluted to volume with deionized water. For analysis by SIDMS, the procedure was slightly modified as discussed in the corresponding section. Sample extracts were also analyzed using EPA RCRA Method 7196A, a UV-VIS colorimetric procedure that uses color formation with diphyenylcarbazide (DPC).

Due to the lack of speciated reference materials, samples were spiked with natural Cr species standard to validate the recovery. Selected samples were also analyzed for the determination of native Cr species. To evaluate the capability of SIDMS in correcting for species conversion, after isotopic spiking, samples were either treated to induce the conversion or left in normal conditions without applying any methods to retard the conversions. Isotope ratios of each species were measured with anion-exchange chromatography/ICP-MS. All raw data were exported to MS Excel and processed, and the deadtime-corrected and mass-bias-corrected isotope ratios were applied to the SIDMS equations 3–6 to deconvolute the initial concentrations of Cr(III) and Cr(VI) and the conversions between them, as well as for incomplete separation.

Synthetic Samples

To demonstrate the SIDMS method of the present invention, water samples were artificially synthesized and were analyzed. This experiment evaluated the ability of SIDMS to measure the conversion of both species in a homogenous water sample with both species undergoing transformation. After a measured amount of $^{nat}$Cr(III) and $^{nat}$Cr(VI) standards were mixed thoroughly at pH 3 to obtain a synthetic Cr speciated solution, it was immediately double spiked with $^{50}$Cr(III) and $^{53}$Cr(VI) isotopic spikes. The spiked sample was then divided into three aliquots.

Figure 4:
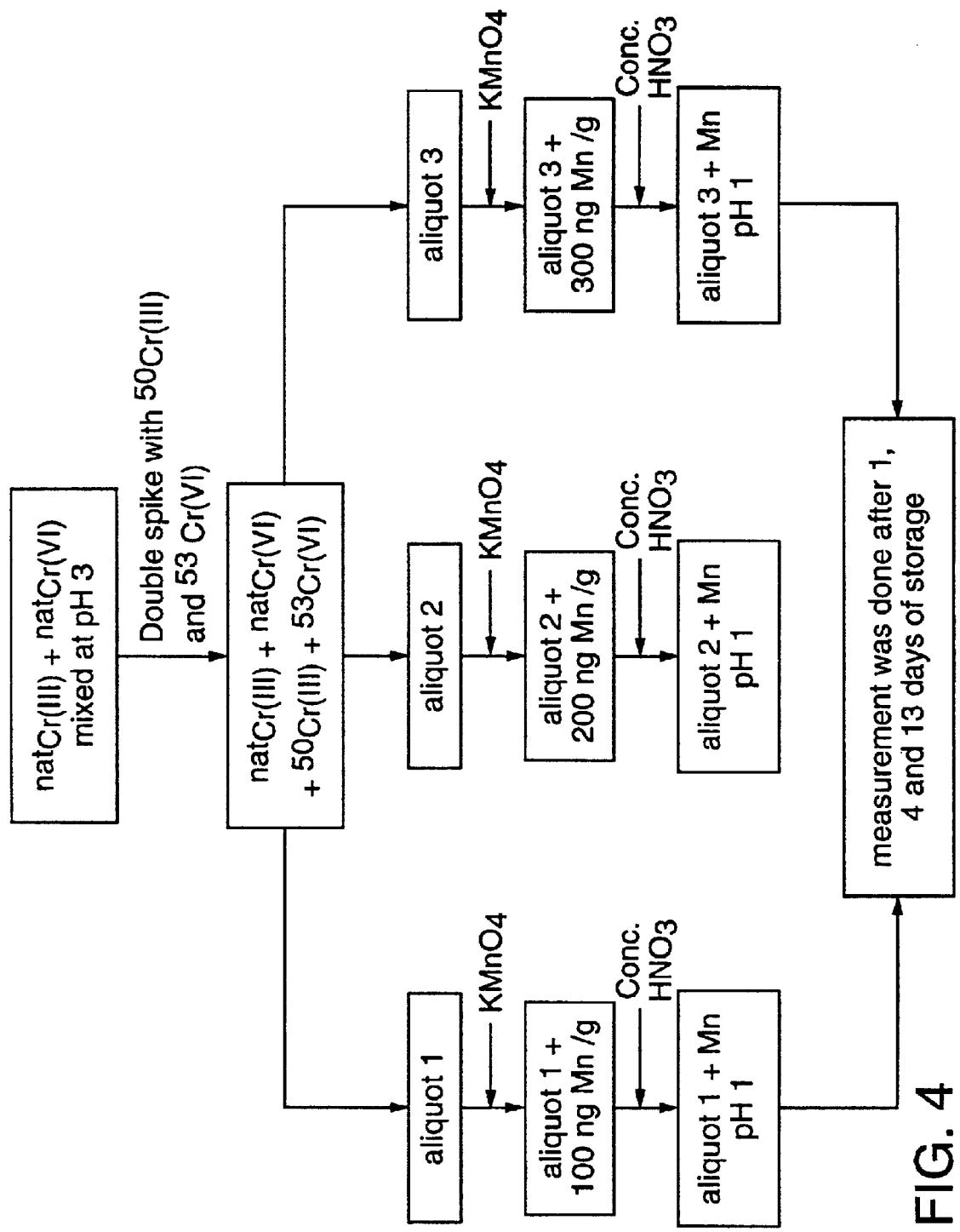
FIG. 4 is a flow diagram showing the preparation and treatment of three aliquots of a water sample.

As shown in FIG. 4, each aliquot of the synthetic water sample was treated differently to induce variable degrees of conversions between Cr(III) and Cr(VI). KMnO$_4$ was added to each aliquot to oxidize Cr(III). Each aliquot contained different concentrations of KMnO$_4$ to convert different amounts of Cr(III) to Cr(VI). As Cr(VI) is unstable at low pH, approximately one hour after the addition of KMnO$_4$, these solutions were acidified to pH 1 (tested using pH paper) with concentrated nitric acid to induce the reduction of Cr(VI).

Each aliquot was measured after one, four, and 13 days of storage. Table 2 lists the results. To show the fundamental difference between the methods of the present invention and those reported in prior publications that also applied isotope dilution in speciation analysis (Van Raaphorst, J. G.; Haremaker, H. M.; Deurloo, P. A.; Beemsterboer, B. *Anal. Chim. Acia* 1994, 286, 291–296; Tanzer, D.; Heumann, K. G. *Anal. Chem.* 1991, 63, 1984–1989; Heumann, K. G.; Rottmann, L.; Vogl, J. *J. Anal. At. Spectrom.* 1994, 9, 1351–1355; Nusko, R.; Heumann, K. G. *Anal. Chim. Acta* 1994, 286, 283–290), both the equations of the present invention (Equations 3–6) and the conventional IDMS equation (Equation 2) were employed to calculate the concentrations. Using SIDMS, the species concentrations in both the original solutions (at the time of spiking) and in the final solutions (at the time of measurement) were calculated. The concentrations at the time of measurement were the results that could not be obtained by other traditional speciation methods, because those traditional methods are incapable of tracing conversions that occur before measurement.

TABLE 2

Results of the Double-spiked Synthetic Aqueous Samples Containing Both Cr(III) and Cr(IV)

| | | SIDMS | | | | Traditional Methods | | Conventional IDMS | |
|---|---|---|---|---|---|---|---|---|---|
| | Days | Concentration (ng/g) | | Conversion (%) | | Concentration (ng/g) | | Concentration (ng/g) | |
| Aliquot | after spiking | Cr(III) | Cr(IV) | Cr(III) to (CrIV) | Cr(IV) to Cr(III) | Cr(III) | Cr(VI) | Cr(III) | Cr(VI) |
| 1 | 1 | 69.8 ± 0.3 | 68.8 ± 0.3 | 4.87 ± 0.22 | 3.57 ± 0.03 | 68.7 | 69.6 | 72.4 ± 0.3 | 72.7 ± 0.3 |
| | 4 | 69.2 ± 0.6 | 69.4 ± 0.3 | 3.47 ± 0.11 | 11.9 ± 0.5 | 75.4 | 62.9 | 78.2 ± 0.6 | 72.5 ± 0.4 |
| | 13 | 70.5 ± 0.9 | 68.5 ± 0.4 | 2.80 ± 0.13 | 22.4 ± 0.2 | 83.1 | 55.2 | 86.7 ± 1.0 | 71.3 ± 0.4 |
| 2 | 1 | 69.9 ± 0.2 | 68.8 ± 0.4 | 17.6 ± 0.1 | 2.95 ± 0.02 | 59.4 | 78.9 | 72.4 ± 0.2 | 82.7 ± 0.4 |
| | 4 | 69.3 ± 0.7 | 69.6 ± 0.6 | 14.6 ± 1.3 | 11.4 ± 0.7 | 67.4 | 70.9 | 78.9 ± 0.7 | 82.1 ± 1.5 |
| | 13 | 70.7 ± 0.4 | 68.8 ± 0.3 | 12.8 ± 0.1 | 22.1 ± 0.3 | 75.9 | 62.4 | 88.6 ± 0.4 | 81.5 ± 0.4 |
| 3 | 1 | 69.8 ± 0.6 | 69.0 ± 0.2 | 23.8 ± 0.3 | 2.76 ± 0.08 | 55.0 | 83.3 | 72.3 ± 0.6 | 87.7 ± 0.3 |
| | 4 | 69.0 ± 0.8 | 69.6 ± 0.3 | 21.6 ± 0.2 | 10.2 ± 0.1 | 61.6 | 76.7 | 78.3 ± 0.8 | 87.8 ± 0.2 |
| | 13 | 70.4 ± 0.5 | 68.9 ± 0.8 | 17.6 ± 0.3 | 22.1 ± 0.1 | 72.5 | 65.8 | 89.4 ± 0.4 | 86.3 ± 0.7 |
| True | | 69.67 | 68.63 | | | 69.67 | 68.63 | 69.67 | 68.63 |

95% confidence interval

Table 2 shows that the SIDMS method of the present invention successfully corrected for the conversion of each species. As shown in columns 5 and 6, each aliquot underwent different degrees of conversion during storage. As less KMnO$_4$ was added to Aliquot 1 than to Aliquot 2 and Aliquot 3, only a small amount of Cr(III) was oxidized to Cr(VI). As Cr(VI) is thermodynamically unstable at low pH, the longer the storage was, the more Cr(VI) was reduced to Cr(III). It will be appreciated that despite the different degrees of conversion, the concentrations deconvoluted by SIDMS were always close to the true concentrations that were prepared. Columns 7 and 8 show the actual concentrations of each species at the time of measurement. These concentrations were calculated from the true concentrations and conversions determined by SIDMS. When comparing the actual concentrations of each aliquot on the same day, it will be seen that more Cr(VI) was present in Aliquot 3 than in Aliquot 1. This observation is consistent with more KMnO4 being added to Aliquot 3. For each aliquot measured on different days, the concentrations of Cr(VI) became lower during storage. This is consistent with the fact that Cr(VI) is easily reduced at low pH.

The significance of the capability of SIDMS in mathematically deconvoluting the conversion between species is illustrated by comparing the actual concentrations of Aliquot 3 on one day and 13 days after treatment. Due to the addition of KMnO$_4$, 23.8% of Cr(III) was oxidized to Cr(VI) after one day, and 55.0 ng/g for Cr(III) and 83.3 ng/g for Cr(VI) would be determined by the traditional speciation methods on that day. The same solution measured after 13 days by the same methods, results in 72.5 ng/g for Cr(III) and 65.8 ng/g for Cr(VI), only 4.1% and −4.2% relative errors for each species. There was not much conversion between Cr(III) and Cr(VI) occurred during the 13 days of storage. Based on the treatment of the aliquots, it is known that two separate redox reactions occurred after isotopic spiking and before measurement: oxidation took place after the addition of KMnO$_4$, and reduction occurred during the storage due to the instability of Cr(VI) at low pH. While the SIDMS methods of the present invention showed these species transformations, conventional prior art methods would not have provided this information. According to the SIDMS results, 17.6% of the Cr(III) was oxidized to Cr(VI) and 22.1% of the Cr(VI) was reduced to Cr(III) after spiking. Because the initial concentrations of Cr(III) and Cr(VI) were 69.67 ng/g and 68.63 ng/g, respectively, the positive and negative errors nearly canceled each other, resulting in actual concentrations of both Cr(III) and Cr(VI) at the time of measurement close to their initial concentrations at the time of spiking. Traditional speciation methods, which can only measure the species concentrations at the time of measurement, would have lead to incorrect conclusions about the bidirectional species conversion described herein.

The speciated isotope dilution method of the present invention is fundamentally different from those in the prior art that applied the isotope dilution techniques to speciation. In the prior art, isotopic spikes for all species had the same isotopic abundances, and the conventional IDMS equation was used in the calculation of the concentration from the measured isotope ratio of each species (Van Raaphorst, J. G.; Haremaker, H. M.; Deurloo, P. A.; Beemsterboer, B. *Anal. Chim. Acta* 1994, 286, 291–296; Tanzer, D.; Heumann, K. G. *Anal. Chem.* 1991, 63, 1984–1989; Heumann, K. G.; Rottmann, L.; Vogl, J. *J. Anal. At. Spectrom.* 1994, 9, 1351–1355; Nusko, R.; Heumann, K. G. *Anal. Chim. Acta* 1994, 286, 283–290.) Although the precision and detection limit were improved by applying the isotope dilution technique, those methods did not address the conversions between the species. In those methods, the different species should not be permitted to intercovert until they are completely separated. Columns 9 and 10 of Table 2 list the results obtained using the IDMS Equation 2. These columns show systemic errors. The more conversions, the higher the relative errors. The SIDMS method of the present invention, however, has the capability to correct for the species conversions in addition to improving the precision and the detection limits of the measurement. This permits the species conversion and corrects for these conversions. These experiments establish that conversion between Cr(VI) and Cr(III) up to at least 80% can be corrected accurately.

This example shows that SIDMS can be used to make quantitative determinations which are accurate despite the degradation, sample loss or conversion. The method advantageously employs mathematical deconvolution in effecting this determination.

Natural Environmental Water Sample

The SIDMS method of the present invention has been applied to the determination of Cr(VI) in real natural water samples. In this experiment, real natural water samples were collected from the Allegheny River (Pittsburgh, Pa.), regular tap (drinking) water (Pittsburgh, Pa.), and deionized water. After collection, each sample was divided into two aliquots without filtration in order to keep all matrix components in the samples. One aliquot was used for the determination of the native concentration of Cr(VI). The other aliquot was immediately spiked with the $^{nat}$Cr(VI) standard to get a solution containing about 50 ng of Cr(VI) per g solution. Both aliquots were then double spiked with $^{50}$Cr(III) and $^{53}$Cr(VI) isotopic spikes, and mixed thoroughly. The concentrations of both $^{50}$Cr(III) and $^{53}$Cr(VI) were approximately 50 ng/g. After isotopic spiking, all solutions were acidified to pH 1.7 to 2.0 with concentrated nitric acid to prevent the loss of Cr(III) during storage (*CETAC Cr speciation Booklet*; Wiederin, D., Gjerde, D., Smith, F., Eds.; CETAC Corporation: Omaha, Nebr., 1994, pp 25). The prepared samples were stored at room temperature for one day prior to measurement.

0.28 M $Na_2CO_3$ and 0.5 M NaOH. After digestion, the sample extracts were filtered and adjusted to pH 7.5±0.5 with concentrated nitric acid and diluted to 100 mL. Two methods were used to quantify the extracted Cr(VI). One was the SIDMS method of the present invention, the other was EPA Method 7196, which has been selected as a detection method in EPA Method 3060A. According to Method 7196A, (SW-846 EPA Method 3060A: Alkaline Digestion of Hexavalent Chromium, *Test Method for Evaluating Solid Waste, Update* 3; U.S. Environmental Protection Agency: Washington, D.C., 1997), the extracts were analyzed by adding DPC and the pH of the solution was adjusted to 1.6 to 2.2 using concentrated $H_2SO_4$ (trace metal grade, Fisher). Cr(VI) reacts with DPC to produce a red-violet complex that can be measured spectrophotometrically at 540 nm.

Several steps may cause problems in the determination of Cr(VI) using Methods 3060A and 7196A pair. During extraction, Cr(III) may be oxidized Cr(VI). Second, Cr(VI)

TABLE 3

The Determination of Cr(VI) in Water Samples with SIDMS

| Sample | $^{nat}$Cr(VI) added (ng/g) | Conc. Cr(III) (ng/g) | Conc. Cr(VI) (ng/g) | $^{nat}$Cr(VI) recovery (%) | Cr(VI) to Cr(III) (%) |
|---|---|---|---|---|---|
| River Water | 0 | <DL[a] | 0.52 ± 0.99 | N/A[b] | 40.6 |
| River Water | 50.83 | <DL | 51.1 ± 0.46 | 99.5 | 30.2 |
| Drinking Water | 0 | <DL | 1.31 ± 0.97 | N/A | 36.7 |
| Drinking Water | 45.65 | <DL | 46.5 ± 0.48 | 99.1 | 20.9 |
| Deionized Water | 0 | <DL | <DL[c] | N/A | 4.2 |
| Deionized Water | 42.83 | <DL | 42.5 ± 0.27 | 98.9 | 4.1 |

[a]The detection limit (DL) for Cr(III) is 0.21 ng/g ($3_o$ value, N = 10).
[b]N/A = Not Applicable
[c]The DL for Cr(VI) is 0.37 ng/g ($3_o$ value, N = 10).
95% confidence intervals Table 3 lists the results of the six prepared water samples. According to SIDMS measurements and calculations, much of the Cr(VI) in river water and drinking water converted to Cr(III) during one day of storage. The Cr(VI) spiked into the deionized water, however, remained fairly stable. As an example, 40.6% and 30.2% of the Cr(VI) in the river samples was reduced to Cr(III); only 4.2 and 4.1% of the Cr(VI) in deionized water was reduced during the same period. This indicates that river water and drinking water contained reducing components in their matrices which reduced Cr(VI) to Cr(III) in the acidified solution. Based on this information, only 35.7 ng/g of the $^{nat}$Cr(VI) in the river sample was left at the time of measurement, which was much lower than the actual spiked concentration of 50.8 ng/g. This 35.7 ng/g is the concentration that would be reported by other traditional speciation methods, assuming that no further species conversion occurred during the measurement with those methods. Using the SIDMS method of the present invention, both the concentrations of the Cr(VI) at the time of spiking and at the time of measurement can be determined accurately.

Chromite Ore Processing Residue (COPR)

COPR is known to contain high levels of Cr(VI) and Cr(III) (James, B. R.; Petura, J. C.; Vitale, R. J.; Mussoline, G. R. *Environ. Sci. & Tech.* 1995, 29, 2377–2381; Vitale, R. J.; Mussoline, G. R.; Peura, J. C.; James, B. R. *J. of Environ. Qual.* 1994, 23, 1249–1256; Vitale, R. J.; Mussoline, G. R.; Petura, J. C.; James, B. R. *Am. Environ. Lab.* 1995, 7, 1). To extract the sample, EPA Method 3060A was employed. This method was developed for extracting Cr(VI) from soil or other solid wastes with a hot, alkaline solution consisting of may be reduced to Cr(III) during pH adjustment from 12 to 7.5. Third, the coexisting reducing components in the samples may cause low recovery of Cr(VI) using Method 7196A (SW-846 EPA Method 7196A: Chromium, Hexavalent (colorimetric), Test Methods for Evaluating Solid Waste, 3rd ed., U.S. Environmental Protection Agency: Washington, D.C., 1996). Because the isotopic spikes were prepared as aqueous solutions, the extraction procedure was not evaluated with the present SIDMS method. The neutralization procedure was evaluated for soil samples as soil samples suffer much more serious reducing matrix effects than other samples. Only the quantification with Method 7196A was evaluated against the present SIDMS method for COPR samples.

After extraction, filtration, and pH adjustment, each extract was divided into two aliquots. One aliquot was neutralized to pH 7.5±0.5 and used for the determination with Method 7196A, the other aliquot was doubled spiked with $^{50}$Cr(III) and $^{53}$Cr(VI), and acidified to pH 1.7 to 2.0 for the determination with SIDMS Table 4 shows the results for three COPR samples quantified with both methods. These samples cover the low, medium, and high concentration range of Cr(VI). Due to the sample heterogeneity, the precision for the replicates of each sample were not as desired for both methods. As a result, the results for each replicate and the standard deviation (SD). Comparing the results of each replicate, both methods give comparable results. For COPR samples, therefore, the present SIDMS method gives equivalent results to Method 7196A for Cr(VI) extracts using the 3060A extraction.

TABLE 4

Results of Cr(VI) for Chromite Ore Processing Residue Samples

| Sample | Method 7196 [Cr(VI)] ($\mu$g/g) | Method 7196 mean ± SD | SIDMS [Cr(VI)] ($\mu$g/g) | SIDMS mean ± SD | Total Cr Cr (mg/g)[a] |
|---|---|---|---|---|---|
| CORP1 | 1327 | 1411 ± 85 | 1373 | 1445 ± 70 | 10.40 |
|  | 1410 |  | 1449 |  |  |
|  | 1497 |  | 1512 |  |  |
| CORP2 | 91.2 | 85.3 ± 5.2 | 93.9 | 88.8 ± 6.1 | 1.973 |
|  | 81.5 |  | 82.1 |  |  |
|  | 83.1 |  | 90.4 |  |  |
| CORP3 | 409 | 408 ± 7 | 420 | 418 ± 9 | 4.597 |
|  | 414 |  | 426 |  |  |
|  | 400 |  | 408 |  |  |

[a]Data were provided by Environmental Standards, Inc. (Valley Forge, PA).

The SIDMS method of the present invention provides information about the influence of matrix effects on the stability of Cr(VI) in the acidified extracts. The SIDMS method of the present invention also permits the validation of the EPA methods as it is an independent method with which permits determination of the amount of Cr(III) and Cr(VI) that has or has not converted. Isotopically-spiked COPR1 extracts were measured nine days after the spiking, and 9.1±1.5% of Cr(VI) was reduced. COPR3 extracts were measured one day after the spiking, and 60.0±5.8% of Cr(VI) was reduced. COPR4 extracts were also measured one day after spiking, and 14.5±1.6% of Cr(VI) was reduced. The lower the native concentration of Cr(VI), the faster the reduction of Cr(VI) in the acidified extracts occurred. In the experiment, to control the concentration of Cr(VI) in the final solution to a proper value, 50 ng/g to 150 ng/g, sample sizes varied depending on the native concentration of Cr(VI). Assuming all these sample have the same level of reducing matrix, the final solution of the sample with low concentration should contain more of the reducing matrix components. COPR3 showed faster reduction of Cr(VI). It is believed that reducing matrix components did not affect Method 7196A because the selectivity of Method 7196A is high enough for these samples. Decreasing the analyte concentration and increasing the matrix concentration may show differences between the present method and Method 7196A, as was found to be true with complex soil samples. Soil extracts spiked with natural Cr(VI) were used to demonstrate the possible bias of Method 7196A in the quantification of Cr(VI) where the matrix produced significant biases in chromium species shifts and direct method interferences in Method 7196A.

Soils

Figure 5:
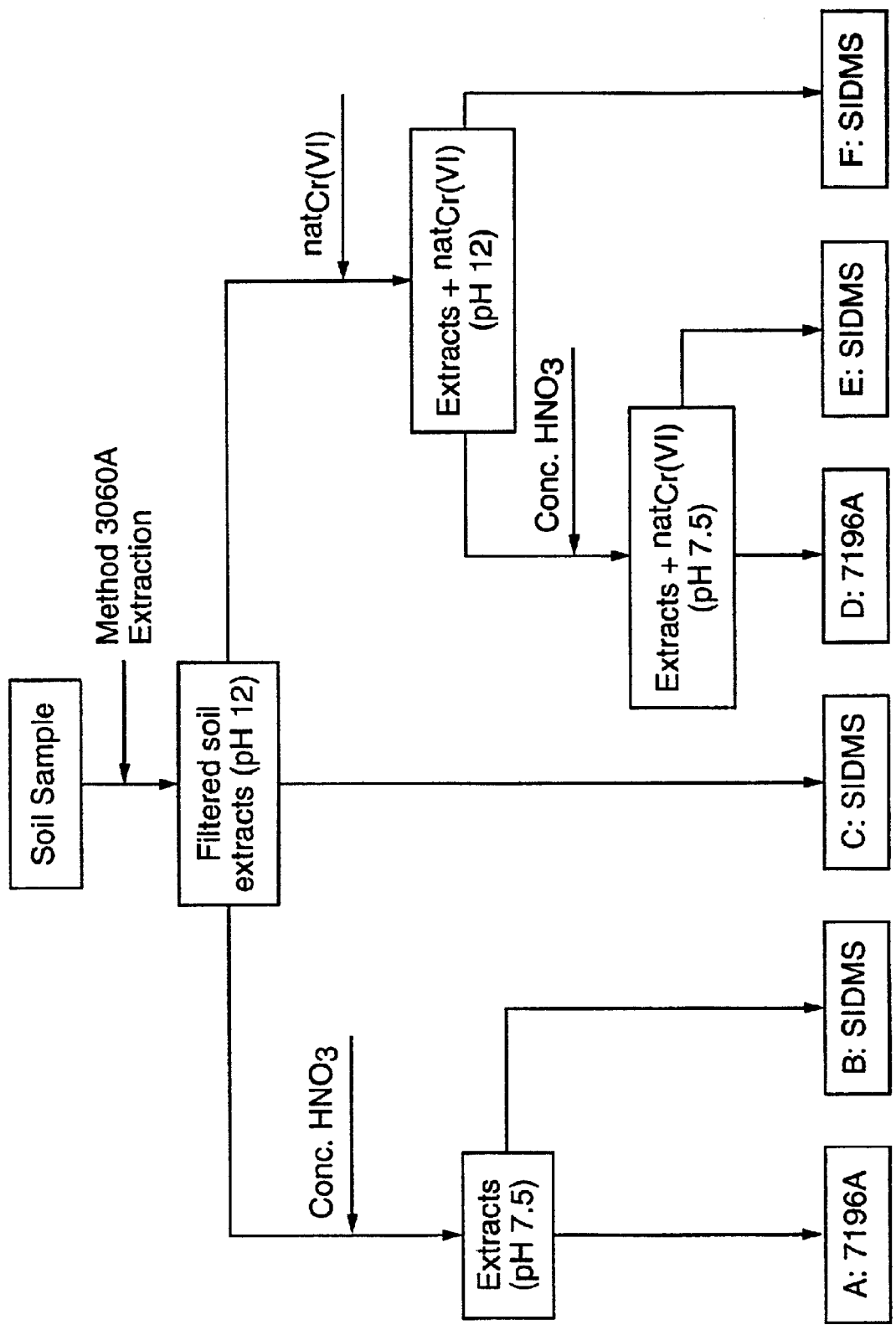
FIG. 5 is a flow diagram showing the treatment of a soil sample by the method of the invention and another method.

Surface soil collected from a yard was analyzed. The sample was dried at 105° C. for four hours, followed by manually removing plant roots and other large particles. After these treatments, the sample was sealed in polyethylene bags and stored in a cold room (4° C.). The possible alteration of the Cr species during drying was not evaluated as the true native levels of Cr species were not of concern in this experiment. The sample was treated according to Method 3060A. The procedure after extraction was altered for the SIDMS method of the present invention to identify the possible conversion of Cr(VI) during the pH adjustment and quantification steps in Method 7196A. Two experiments were designed to compare SIDMS and EPA Method 7196A in the quantification of Cr(VI) in soil extracts. The first experiment showed the systematic bias in Method 7196A. The second experiment identified the bias sources by employing SIDMS as a diagnostic tool. The flow chart of FIG. 5 is the procedure for the second experiment. In the first experiment, only solutions D and F of FIG. 5 were prepared for comparing SIDMS and Method 7196A.

The first experiment compared Method 7196A and SIDMS (the method of the present invention) using four samples. Sample 1 to 4 contained soil extracts digested from 0, 1.53, 3.06 and 3.12 g of soil. After extraction with Method 3060A, each sample was spiked with $^{nat}$Cr(VI) so that each one contained 2.997, 3.033, 1.993, and 1.587 $\mu$g of Cr(VI) per g solution, respectively. Thus, the matrix (unit: g soil) to Cr(VI) (unit: $\mu$g Cr/g) ratio for each sample was approximately 0, 0.5, 1.0, and 2.0. Various amount of soils were used in order to ensure the extracts had different matrix levels. A portion of the spiked extract was sampled for SIDMS analysis, and the rest of the extract solution was adjusted to pH 7.5±0.5 with concentrated nitric acid according to Method 3060A. The pH adjusted extracts were then analyzed by Method 7196A. As shown in FIG. 5, solution F was analyzed by SIDMS, solution D was analyzed by Method 7196A.

Effect of Complex Matrices on the Validation of Other Methods

Figure 6:
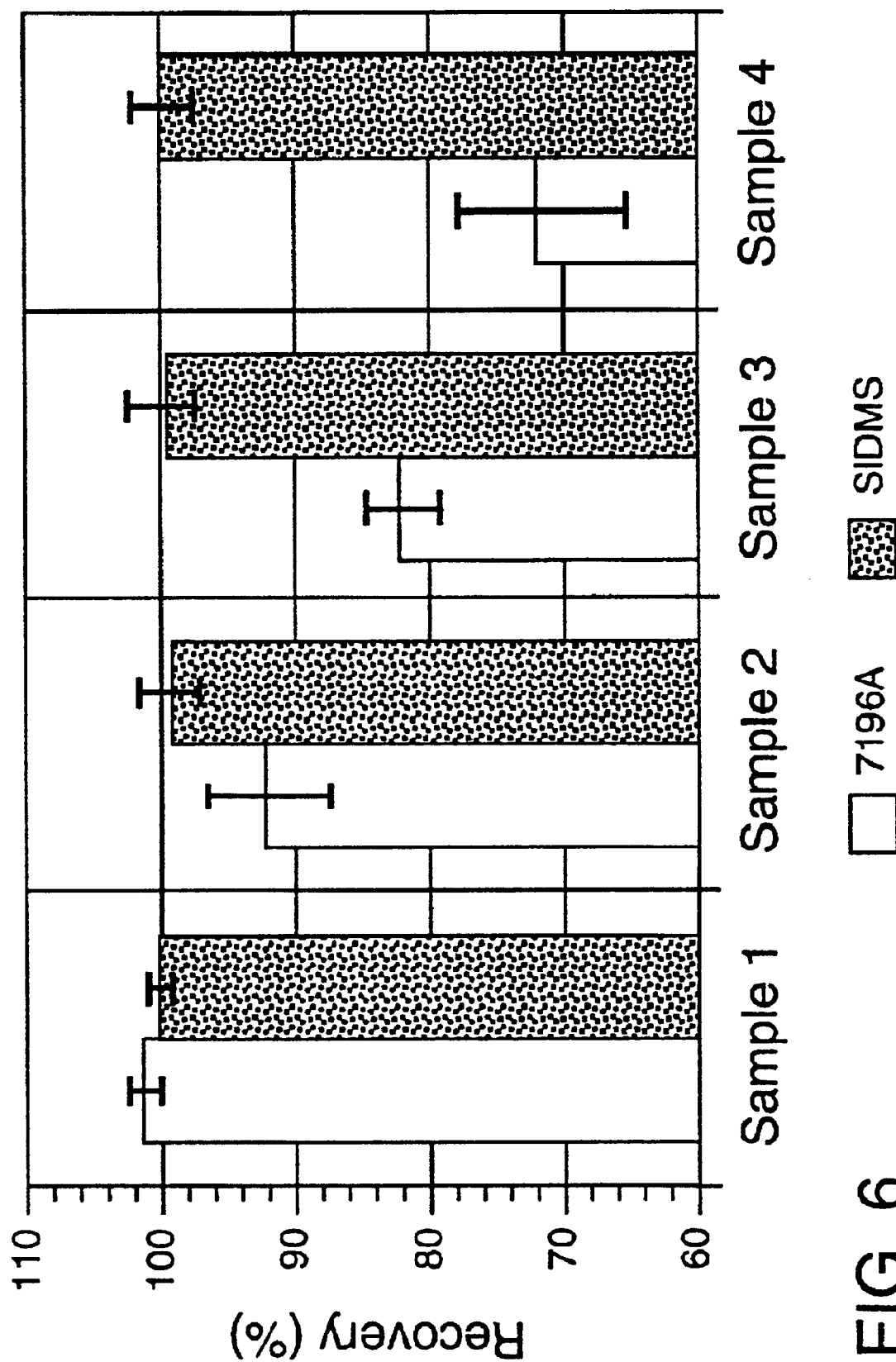
FIG. 6 is a representation of the influence of soil matrix on recovery of Cr(VI) determined by the method of the invention and another method.

The recoveries of each method are shown in FIG. 6 which compares the influence of soil matrix on the recovery of Cr(VI) determined with Method 7196A and the SIDMS method of the present invention. Sample 1 did not contain a soil matrix, and the recoveries of Cr(VI) obtained from both methods agreed with each other and were close to 100%. As shown in FIG. 6, however, the soil matrix caused low recoveries of Cr(VI) using Method 7196A. The higher the ratio of soil matrix to Cr(VI) meant the lower the recovery of Cr(VI). Sample 2 to 4 contained increasing amounts of soil matrix. According to Method 7196A, after the addition of DPC to the sample, the solution was acidified to pH 1.6–2.2 to produce a measurable purple complex. The colorization reaction involves the simultaneous oxidation of DPC to diphenylcarbazone, reduction of Cr(VI) to Cr(III), and the chelation of the Cr(III) by diphenylcarbazone (Dionex In *Dionex Ion Chromatography Recipe Book*; Dionex Corporation: Sunnyvale, Calif., 1990; Vol. Technical Note 26, pp 7). At such a high pH as 12, Cr(VI) is fairly stable, so the reductants coexisting in the soil extracts did not reduce Cr(VI). When the solution was acidified, however, the reductants from the soil matrix competed with the DPC to reduce Cr(VI). Some Cr(VI) could not react with the DPC to form the purple product which is measured by the UV-Vis method. As a result, as some Cr(VI) did not form the measurable product, the method resulted in a low recovery. A detailed observation of this bias was described elsewhere (Lu, Y.; Huo, D.; Chalk, S.; Kingston, H. M. "Identification of Cr(VI) Biases in EPA Method Pairs 3060A and 7196A" in progress).

Figure 7A:
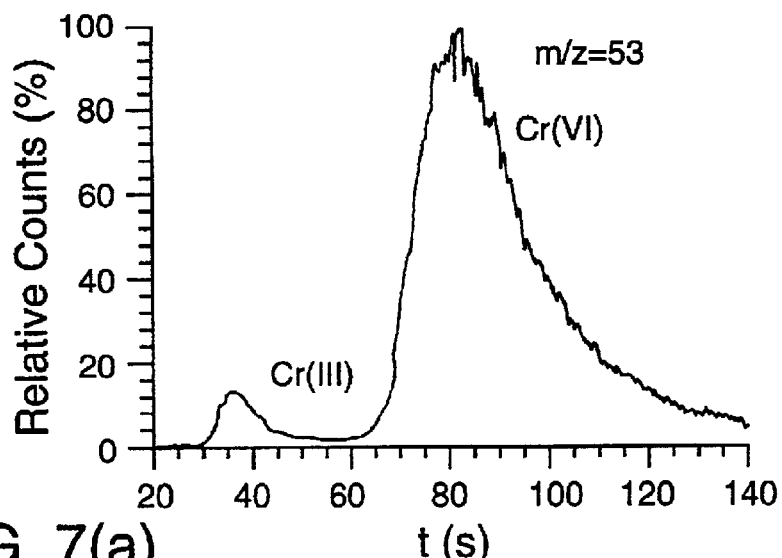
FIGS. 7(a)–7(c) represent a series of plots of the reduction of Cr(VI) spiked into soil extracts measured at different time intervals with respect to the acidification step.
Figure 7B:
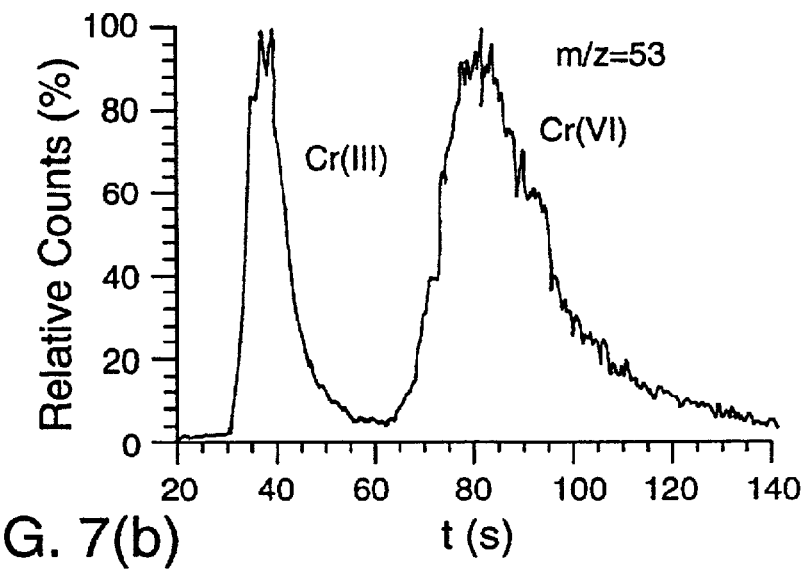
Figure 7C:
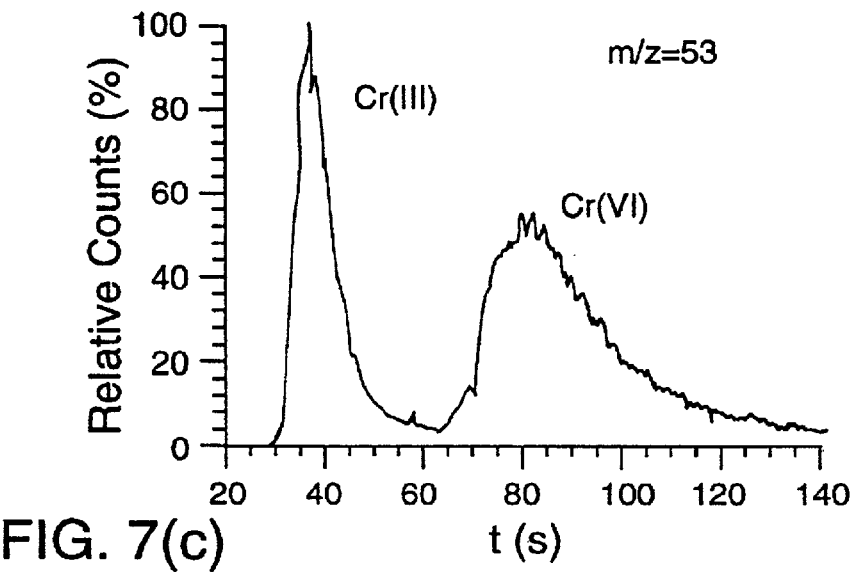

The SIDMS method of the present invention indicated the major source of bias in the quantification of Cr(VI) in these samples using Method 7196A, and corrected for such conversions. In the SIDMS method, the sample solutions were isotopically spiked before acidification. Although the isotopically-spiked sample solution were acidified to a low pH of 1.7 to 2.0, the reduction of Cr(VI) caused by the soil matrix was successfully corrected because any conversions that occurred after spiking can be corrected with SIDMS. The reduction of Cr(VI) occurred rapidly after the acidification for some samples. FIGS. 7(a) to 7(c) are the chromatograms of Sample 4 (FIG. 6). FIGS. 7(a)–7(c) illustrate the sample immediately after the acidification of the spiked sample. FIGS. 7(b) and 7(c) were acquired six and sixteen minutes after the acidification. These figures plot only the isotope $^{53}$Cr, which was mainly from $^{53}$Cr(VI) spike in this sample. It is seen that Cr(VI) was reduced very quickly after the acidification. From FIGS. 7(a) to 7(c), 4.5%, 20.2%, and 28.1% of Cr(VI) was reduced to Cr(III). The corrected concentrations of Cr(VI) were 166, 169, and 170 ng/g, respectively, consistent with the true concentration of the Cr(VI) spiked into the soil extracts, which was 170.9 ng/g.

The SIDMS method of the present invention can be used as a diagnostic and validation tool to monitor the species. To do this, samples were isotopically spiked before and after a treatment. As an example, in the second experiment, the soil extracts were isotopically spiked before (Samples C and F) and after (Samples B and E) pH adjustment to check the possible alteration of the species during pH adjustment. FIG. 5 shows the procedures that were followed in this experiment. Samples A, B, and C were used to determine the native Cr(VI). Samples D, E, F were used to determine the recovery of Cr(VI). A, B, D and E were obtained following EPA Method 3060A extraction, in which a pH adjustment step is required. C and F omitted the pH adjustment step, and were submitted directly to SIDMS. To compare the results, all numbers shown in Table 5 were those in the original extracts. When compared with the results obtained using the SIDMS method of the present invention, the bias of Method 7196A is apparent. According to Method 7196A, the native Cr(VI) in the analyzed sample was not detected (A); however, the SIDMS method of the present invention results (B and C) indicated the existence of native Cr(VI) in the sample. The Cr(VI) may not have been detected by Method 7196A due to the detection limit of Method 7196A not having been low enough, or the reducing matrix components may have interfered with the measurement. The detection limit of Method 7196A is 0.01 μg/g and the native Cr(VI) in the extracts is 0.08 μg/g, excluding the first possibility.

As shown in the first experiment, reducing soil matrix components permitted better recovery of Cr(VI) using Method 7196A: the higher the matrix, the lower the recovery. For the determination of Cr(VI), even though the Cr(VI) concentration may be high enough for the quantification in clean solutions, it may not be detected in soil extracts or other reducing matrices. The recovery of the spiked Cr(VI) determined with EPA Method 7196A (Sample D) the highest soil matrix was only 71.6%, thereby indicating the importance of matrix effect. Based on this analysis, approximately 57 μg of Cr(VI) was not detected in this sample with EPA Method 7196A, which was much higher than the native Cr(VI) in soil extracts. The matrix effect, therefore, with EPA Method 7196A results in underestimation of Cr(VI) which is a dangerous defect for purposes of toxicity evaluation. The SIDMS method of the present invention improves the quantification of Cr(VI) at least in two aspects: (a) lower detection limits and (b) the capability of correcting for species conversions, which provides for a more accurate and reproducible mesurement.

TABLE 5

SIDMS as a Validation Tool Compared with Method 7196A in the Quantification of Cr(VI) in Soil Extracts

| | SIDMS | | | | Method 7196A | |
|---|---|---|---|---|---|---|
| | Cr(VI) added (μg) | Cr(III) (μg) | Cr(VI) (μg) | Cr(VI) recovery (%) | Cr(VI) (μg) | Cr(VI) recovery (%) |
| A | 0 | NA | NA | NA | <DL | NA |
| B | 0 | <DL | 7.7 ± 1.8 | NA | NA | NA |
| C | 0 | <DL | 9.5 ± 2.5 | NA | NA | NA |
| D | 191.8 | NA | NA | NA | 137 ± 12 | 71.6 |
| E | 191.8 | 5.1 ± 3.3 | 192 ± 3.1 | 95.2 | NA | NA |
| F | 191.8 | <DL | 200 ± 1.5 | 99.3 | NA | NA |

95% confidence intervals

The SIDMS method of the present invention successfully identified and corrected for the reduction of Cr(VI) that occurred at the neutralization step. The recoveries of Sample F and Sample E were 99.3% and 95.2%, respectively. If the criteria (85%~115% of recovery) specified in Method 7196A is used, 95.2% is within the specification. Because the concentrations of Cr(VI) found in E an F are significantly different, it is important to identify the sources causing the difference. As shown in Table 5, no Cr(III) was found in F, but 5.1±3.3 μg of Cr(III) was detected in E. If this amount of Cr(III) is treated as the reduced Cr(VI), the total amount of Cr(VI) in these two solutions are comparable. The reduction of Cr(VI), therefore, occurred during the pH adjustment. The determination of native Cr(VI) in B and C also supports this conclusion that the detected native Cr(VI) by the SIDMS method with isotopic spiking before and after pH adjustment were 9.5 and 7.7 μg, respectively. Although these two numbers are not significantly different at the 95% confidence level, it is reasonable to observe a lower concentration obtained by spiking the sample after pH adjustment than before, due to the reducing matrix. Consequently, by isotopically spiking the sample at different stages, the alteration of the species at each step can be identified. Traditional methods can not do this because they can only determine the species concentration in the processed final solutions.

Correction for Incomplete Species Separation

Unlike traditional speciation methods that require complete separation, the SIDMS method of the present invention permits the incomplete separation of the species. Incomplete resolution of the species results in mixtures of species being detected simultaneously as one species by ICP-MS. In traditional methods, incomplete separation interferes with accurate measurement. SIDMS, however, treats the unsolved or co-eluted species as if they have interconverted. The same SIDMS equations that calculate the initial species concentrations at the time of spiking can also correct for incomplete separation. This capability allows mild experimental conditions to be used in separation and avoids the required use of extreme conditions to achieve the 100% separation required by other speciation methods. If there is incomplete separation in the present SIDMS method, the amount of conversion will incorporate both conversion and incomplete separation of the species.

Figure 8:
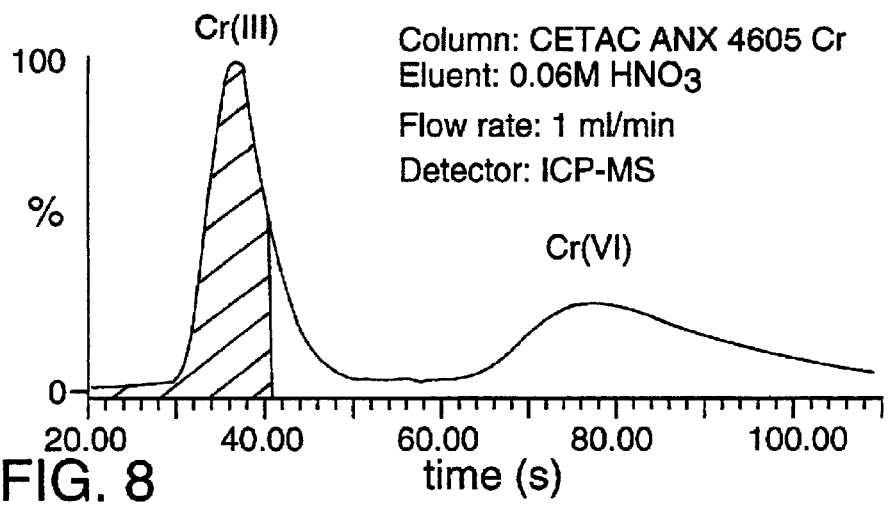
FIG. 8 is a plot of time versus percentage for different degrees of incomplete separation.

To confirm that the SIDMS method of the present invention can correct for the incomplete separation of the species, a double-spiked Cr(III) and Cr(VI) aqueous solution was freshly prepared using the procedures previously described herein. This synthetic sample contained 1495 ng/g of $^{nat}$Cr (VI), 1499 ng/g of $^{53}$Cr(VI), 1517 ng/g $^{nat}$Cr(III) and 1584 ng/g of $^{50}$Cr(III). In this experiment, the outlet of the column was disconnected from the ICP-MS and the eluate was collected into 10 mL polypropylene test tubes. The synthetic sample was injected into the column for separation, but each time a different fraction of the eluate was collected as Cr(III), and the remaining as Cr(VI) by setting a different dividing time point. This resulted in incomplete separation. FIG. 8 shows the chromatogram where eluate of 10–40 seconds was collected as Cr(III) and 40 seconds to 10 minutes was collected as Cr(VI). Some Cr(III) was detected as Cr(VI). The dividing time point for this pair of fractions was 40 seconds. Sets of solutions with different dividing time points were then obtained and resulted in different degrees of incomplete separation. After collection, each fraction was diluted to approximately 10 mL with 0.06M $HNO_3$, and the isotope ratios were measured with ICP-MS using the direct aspiration mode.

Figure 9A:
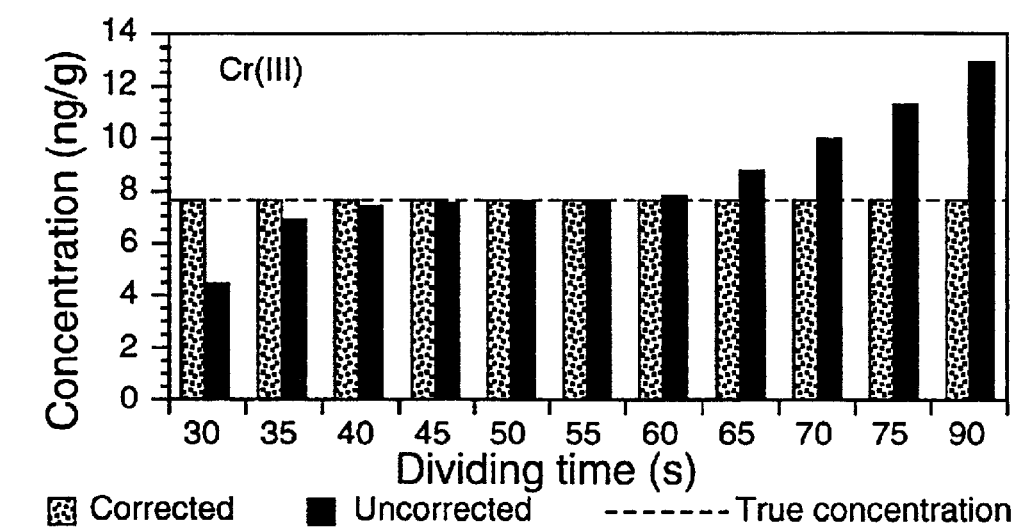
FIGS. 9(a) and 9(b) show plots with respect to Cr(III) and Cr(VI) as corrected for incomplete separation.
Figure 9B:
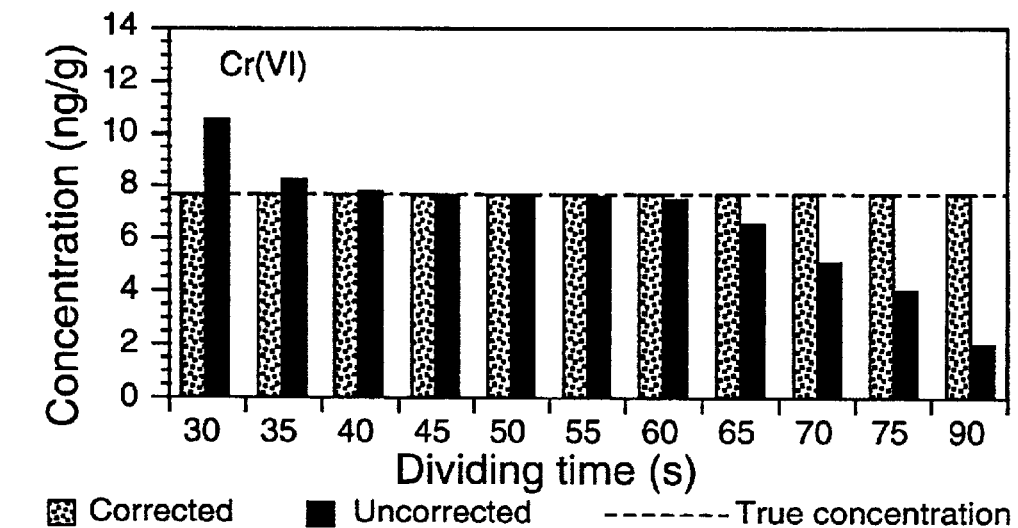

FIGS. 9(a) and 9(b) show the actual total concentration of Cr in each container as well as the concentrations of Cr(III) and Cr(VI) corrected for incomplete separation. The true concentrations indicated in the figures are different from those described in the previous paragraph. This is due to dilution. For example, because the injection volume was 50 μL and the collected eluate was diluted to 10 mL, the dilution factor was 200. As the original concentration of $^{nat}Cr(III)$ was 1517 ng/g, if all Cr(III) was separated from Cr(VI), the concentration of $^{nat}Cr(III)$ in Cr(III) container should be 7.58 ng/g. This number was treated as the true concentration because the diluted solution was used in isotope ratio measurement. Because of the dilution effect, the number of original concentration of each species, from both natural standard and isotopic spike, was divided by 200.

Despite the incomplete separation, the concentrations of both $^{nat}Cr(III)$ and $^{nat}Cr(VI)$ were successfully deconvoluted with good precision. In FIGS. 9(a) and 9(b), the shaded columns are the corrected initial concentrations. The black columns are the actual concentrations of Cr collected. The actual concentrations are the numbers that would be reported by other conventional speciation methods. Normally, the longer the collection time for Cr(III), the higher concentration of Cr detected as Cr(III) and the lower the concentration of Cr detected as Cr(VI). Despite the different degrees of the separation, the deconvoluted concentrations using the SIDMS method of the present invention always agreed with the true concentrations at the time of spiking after correction for the dilution factor. In FIGS. 9(a) and 9(b), the 95% confidence intervals of the corrected concentrations were also indicated, but they cannot be seen due to the high precision of the results. In this set of data, the relative standard deviations (RSDs) were within the range of 0.12% to 0.48%. For the last collection where the dividing time point is 90 second, there was only 27% of $^{nat}Cr(VI)$, corresponding to 2.01 ng/g of $^{nat}Cr(VI)$, was collected as Cr(VI), and the RSDs for Cr(III) and Cr(VI) were 0.38% and 0.41%, respectively.

An additional use of the present method of SIDMS is in the validation of more efficient methods for extraction or separation that currently are not usable as they do are not completely separated or do not completely preserve the species. For example, closed vessel microwave extractions at higher temperatures than are achievable at atmospheric pressure are more efficient, but if degradation is known to occur then this more efficient extraction could not be used by traditional speciated methods that require complete retention of the species. Other methods require the preservation of species while the SIDMS method of the present invention can optimize efficiency and correction for degradation to enhance the efficiency and productivity of the methods of analysis. An example is the faster extraction that has some degradation that is permitted by SIDMS, but which may not be used by other methods as the species transformations are interpreted in these methods as biases and errors, but which in SIDMS are efficient separation methods that have some correction that may be necessary.

Figure 10:
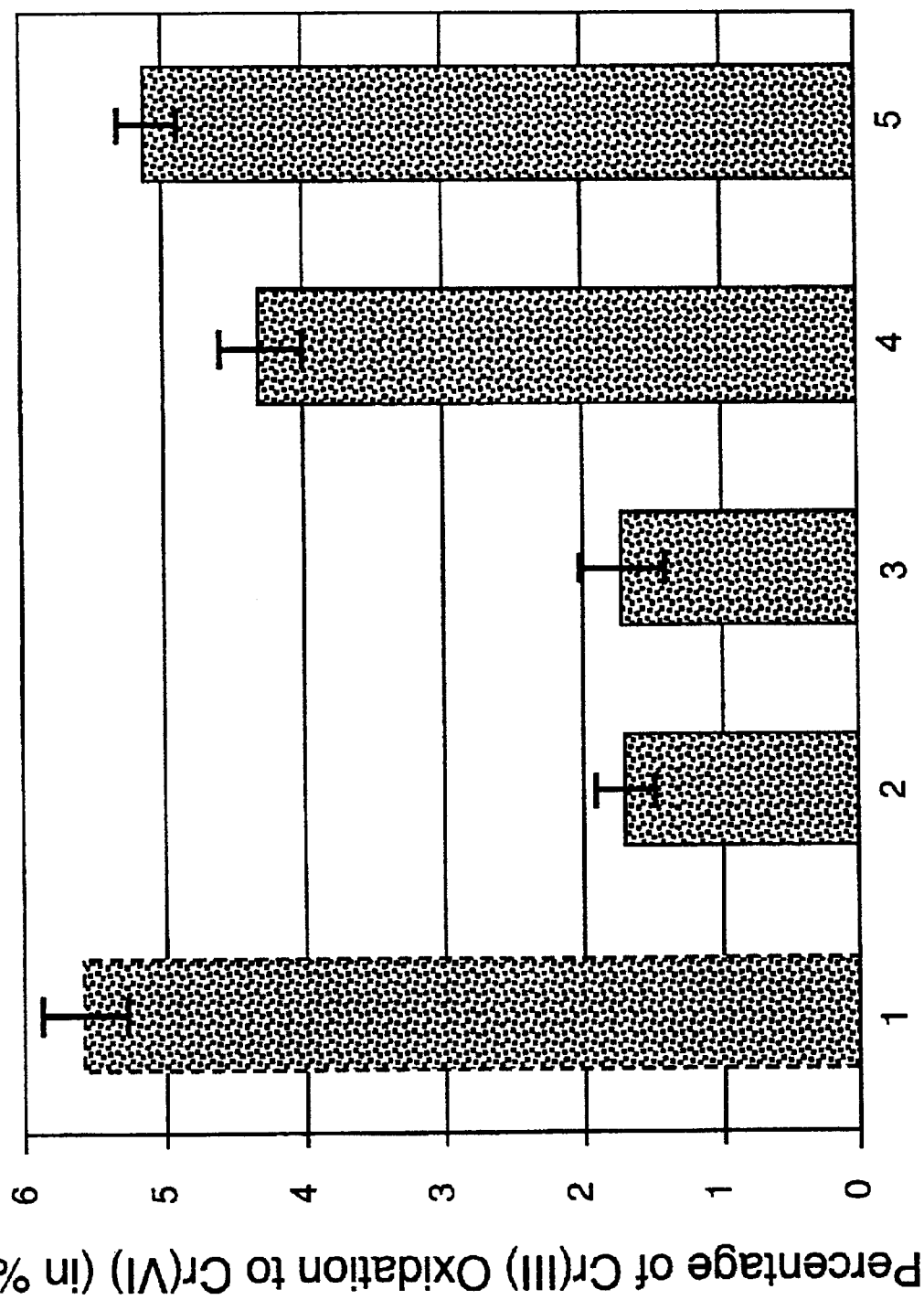
FIG. 10 is a plot of the oxidation of Cr(III) under different conditions including application microwave energy.

An example of the efficiency gained through the SIDMS of the present invention when applied to separation of species as compared in the standard EPA Method 3060A extraction method done on a hot-plate and in a microwave extraction system. Oxidation of Cr(III) to Cr(VI) may take place in high pH solutions, and EPA Method 3060A extraction requires an 11.5 to 12 pH for efficient extraction of Cr(VI). In such high pH solutions, Cr(III) may be oxidized to Cr(VI) if some oxidants are present. The standard procedure requires that the extraction solution (0.5M NaOH and 0.28M $Na_2CO_3$ be kept at an elevated temperature of between 90 and 95° C. for 60 min. The efficiency advantage is demonstrated using a microwave extraction in closed vessel at higher temperatures for shorter times with the same amount of oxidation of Cr(III) to Cr(VI). Approximately 200 μg Cr(III) was added to a microwave closed Teflon vessel or a beaker and almost the same extraction procedure was performed (heating to 92° C. for 60 min.). Oxidation of Cr(III) was observed for all these three systems (FIG. 10) shows 5.6% oxidation of Cr(III) for the standard hot-plate method (bar 1). However only 1.7% oxidation of Cr(RI) occurred in the closed vessel microwave system heating to 92° C. for 60 minutes with argon gas atmosphere (bar 2) or with air (bar 3). Microwave extraction at a higher temperature of 120° C. for 60 min. (bar 4) demonstrates a similar extraction, but less oxidation. However similar extraction can be achieved in only 10 min. using 150° C. (bar 5) in the microwave closed vessel system with approximately the same amount of oxidation. It will be appreciated that with a closed microwave system employed for extraction, extraction can be accomplished in about 5 to 30 minutes and preferably about 10 to 20 minutes. This is preferably done at a temperature of about 90° C. to 150° C. and preferably about 135° C. to 150° C. In each case the oxidation occurs and is corrected for, but in each case it can be corrected for using the SIDMS method of the present invention. Other efficient methods of extraction and separation may be used with SIDMS as the detection method with correction for these transformations that occur during the separation process.

Recovery of Insoluble and Non-separated Components

Losses of insoluble species components can be corrected for with the use of the SIDMS methods of the present invention. For example, potassium dichromate ($K_2CrO_4$) is highly soluble, but both barium chromate ($BaCrO_4$) and lead chromate ($PbCrO_4$) are relatively insoluble forms of Cr(VI) compounds. In experiments 0.0244 g of $BaCrO_4$ containing 5010 μg of Cr(VI) and 0.017 g of $PbCrO_4$ containing 2790 μg of Cr(VI) were added to samples to be extracted using method 3060A. Lead chromate is soluble in the basic solution used in the standard extraction solution probably as $Pb(OH)_4^{-2}$. It was found that both water soluble and water-insolubleforms of Cr(VI) were extracted by EPA Method 3060A, but that when neutralization to pH 7.5 was done at the end of the extraction as required the majority of the insoluble forms of Cr(VI) were removed from solution with the filtered sample material. This would produce significant errors in traditional methods as the portion removed from solution as insoluble would not be measured at all. To illustrate the amount of Cr(VI) in solution as $CrO_4^-$ ion experiments were done to observe when the precipitation of PbCrO$_4$ would start to precipitate. The error occurring in other total recovery methods would be different depending on the amount of PbCrO$_4$ in the sample. The precipitation in known EPA Method 3060A extraction solution is dependent on the total quantity of insoluble chromate compounds present.

As sufficient Cr(VI) remained in solution to analyze by the SIDMS methods of the present invention and the isotopic speciated spike and natural component were equilibrated during the time the compounds were soluble at high pH 11.5 to 12 the SIDMS measurements proved 100% recovery correction and gave correct values for the true concentrations of Cr(VI) in the original samples. This is a further demonstration of the unique ability of SIDMS to make accurate determinations even with incomplete separations.

SIDMS as a Method for Preparing Speciated Standard Reference Materials

As analyzing of samples for species concentration accuracy requires standard reference materials analyzed and certified for individual species composition the use of SIDMS permits both the preparation of accurate evaluation of speciated standards and their certification. Standard reference materials must both be stored and shipped to destinations to make them practical to use. They must also represent real natural materials encountered in nature with all of the normal complexities such as interconversion of reactive species, insoluble fractions, and difficult extractions and separations. In the preparation and storage of these materials there must be a way to evaluate them accurately without bias due to the (a) method of analysis, or (b) matrix components, or (c) degradation, or (d) conversion of the speciated material. These standards may be prepared with speciated spikes permitting them to be analyzed using the SIDMS methods of the present invention. This also permits them to be used after some interconversion has occurred during storage, shipping conditions, or matrix component interactions. If the initial concentration and isotopic information for the speciated spike is provided the standard can be analyzed using the SIDMS methods and corrections for the procedural biases corrected. This combination of SIDMS and standard preparation provides a significant new tool and that will enable validation of other methods. Just as errors in sample such as the soils has been demonstrated herein for EPA methods 3060A and 71966A they could be evaluated and validated when biases occur such as in soil or when no bias is caused by the method such as in the case of the COPR samples. The coupling of this technique to standard preparation and evaluation may be employed to validate other methods and to ensure the validity of speciated standards.

Standards themselves are less vulnerable to errors if shifts occur in composition of species during preparation, storage, shipment or method evaluation. Biases inherent in the material or the methods may be corrected and methods can now be prepared to assist with calibration and accuracy determinations of other methods.

The present invention also may be employed with an insoluble species. For example, lead chromate is only soluble in one stage of separation, but may then be completely analyzed due the residual solubility after the majority of it has fallen out of solution.

The theoretical background and the experimental data provided herein support the effectiveness of the SIDMS methods of the present invention. Using the SIDMS method, the conversion and the incomplete separation of the species can be effectively corrected. SIDMS also provides a valuable tool to trace species conversion throughout the sample preparation/analysis process. New and intermediate species may be evaluated for their significance in species transformations. Multiple forms of speciated spikes may be employed for some species. This method provides a diagnostic tool that permits the validation of other speciation methods, and provides reliable data for speciated metrology.

It will be appreciated that the methods of the present invention permit speciated isotope dilution measurement even with incomplete specie separation. In the present invention, 100 percent separation is not required. It will generally be preferred that at least 5 percent and most preferably at least 10 percent of the specie be separated. The invention can tolerate up to about 90 to 95 percent of a species not being separated or being lost, converted or degraded. If a single specie is to be measured, separation from the specie-containing specimen is effected. If more than one specie is to be measured, each species will preferably be separated from both the species containing sample and from each other species. This applies to both the natural and spiked form of each species from the natural and spiked form of another species. There is also no need to have an equal portion of each species to be measured.

While for clarity of disclosure herein emphasis has been placed on environmental uses of the present invention, the invention is not so limited. Numerous additional uses, such as industrial processes or food processing and storage, for example, will be apparent to those skilled in the art.

It will be appreciated, therefore, that the method of the present invention provides for accurate speciated isotope dilution mass spectrometry quantification of one or more species. It does so in a valid and reliable manner which is adapted to compensate for conversion and/or incomplete separation of the species. It also facilitates validation of other methods and preparation and analysis of speciated standard reference materials.

Whereas particular embodiments of the invention have been described above for purposes of illustration, it will be evident to those skilled in the art that numerous variations of the details may be made without departing from the invention as defined in the appended claims.

I claim:

1. A method of speciated isotope dilution measurement of a sample comprising providing a plurality of predetermined stable isotopes, preparing a different isotopic spike for each species to be measured by converting each said stable isotope to a speciated enriched isotope corresponding to the species to be measured in said sample, spiking the sample containing said species to be measured, equilibrating said isotopic spiked species with said species to be measured, separating only a portion of said species from said sample in order to effect incomplete separation, making isotope ratio determinations for each said specie to be measured and mathematically deconvoluting said species concentration and if species conversion has occurred correcting for species conversion, and effecting said mathematical deconvolution while correcting for said incomplete separation of said species from said sample.

2. The method of speciated isotope dilution measurement of claim 1 including employing said method on more than one said species to be measured simultaneously.

3. The method of speciated isotope dilution measurement of claim 2 including employing said process on a plurality of said species to be measured, and incompletely separating said species from other said species in said sample.

4. The method of speciated isotope dilution measurement of claim 2 including employing said method in quantifying Cr(III) and Cr(VI).

5. The method of speciated isotope dilution measurement of claim 4 including effecting said separation after reduction of a substantial portion of Cr(VI) to Cr(III).

6. The method of speciated isotope dilution measurement of claim 1 including employing a mass spectrometer to determine said isotopic element ratios.

7. The method of speciated isotope dilution measurement of claim 1 including employing time resolution chromatography to effect said separation.

8. The method of speciated isotope dilution measurement of claim 1 including employing said process on a sample which has experienced specie conversion prior to separation.

9. The method of speciated isotope dilution measurement of claim 1 including effecting said equilibrium in an aqueous solution.

10. The method of speciated isotope dilution measurement of claim 1 including employing said process on a soil sample.

11. The method of speciated isotope dilution measurement of claim 1 including employing said process on an aqueous sample.

12. The method of speciated isotope dilution measurement of claim 1 including employing said process on solid waste from a chromite ore processing system.

13. The method of speciated isotope dilution measurement of claim 1 including storing said sample after said equilibrating step and prior to said separating step.

14. The method of speciated isotope dilution measurement of claim 1 including effecting said mathematical deconvoluting simultaneously with respect to more than one species to be measured.

15. The method of speciated isotope dilution measurement of claim 14 including effecting said mathematical deconvoluting for each species independently of other species.

16. The method of speciated isotope dilution measurement of claim 14 including effecting said separation of about 5 to 10 percent, of each said species from said sample and from said other species before effecting said deconvolution.

17. The method of speciated isotope dilution measurement of claim 1 including effecting said separation by at least one method selected from the group consisting of chromatography, microwave assisted extraction, soxhilate extraction, solvent dissolution, acid dissolution, acid or base hydrolysis distillation, centrifugation, and solvent extraction.

18. The method of speciated isotope dilution measurement of claim 1 including effecting said separating by microwave assisted extraction for a period of about 5 to 15 minutes.

19. The method of speciated isotope dilution measurement of claim 18 including effecting said separating at about 90° C. to 150° C.

20. The method of speciated isotope dilution measurement of claim 18 including employing in said microwave extraction closed vessel microwave extraction.

21. The method of speciated isotope dilution measurement of claim 1 including after effecting said speciated isotope dilution measurement of a sample comparing the results of said measurement with measurements made by another type of test to evaluate the validity of said another type of test.

22. The method of speciated isotope dilution measurement of claim 21 including effecting a plurality of measurements by said another test and effecting said comparison in evaluating the validity of said another type of test.

23. The method of speciated isotope dilution measurement of claim 21 including employing said method to validate said tests which are not independently capable of compensating for incomplete species extraction or species conversion.

24. The method of speciated isotope dilution measurement of claim 1 including employing said method to prepare speciated spiked standard materials.

25. The method of speciated isotope dilution measurement of claim 24 including creating said speciated spiked standard by spiking separated stable isotopes in speciated form.

26. The method of speciated isotope dilution measurement of claim 1 including employing said method to prepare standard materials.

27. The method of speciated isotope dilution measurement of claim 26 including employing said standard materials after storage.

28. The method of speciated isotope dilution measurement of claim 26 including employing said method to correct species shifts in said standard materials after degradation.

29. The method of speciated isotope dilution measurement of claim 1 including performing said method on a species which in addition to said incomplete separation, has a further reduction in said species due to at least one cause selected from the group consisting of loss, conversion and degradation has less than 10 percent of said species separated.

30. The method of speciated isotope dilution measurement of claim 29 including effecting said separation of at least about 5 to 10 percent of said species.

* * * * *

UNITED STATES PATENT AND TRADEMARK OFFICE
CERTIFICATE OF CORRECTION

PATENT NO. : 6,790,673 B1  
APPLICATION NO. : 09/015469  
DATED : September 14, 2004  
INVENTOR(S) : Howard M. Kingston Page 1 of 1

It is certified that error appears in the above-identified patent and that said Letters Patent is hereby corrected as shown below:

Col. 13, line 33 "$R_{50/52}^{III}$", should read --$R^{III}_{50/52}$--.

Col. 13, line 35 "$R_{53/52}^{III}$", should read --$R^{III}_{53/52}$--.

Col. 13, line 35, "$^{53}C$" should read --$^{53}Cr$--.

Col. 13, line 37, "$R_{50/52}^{VI}$" should read --$R^{VI}_{50/52}$--.

Col. 13, line 39, "$R_{53/52}^{VI}$" should read --$R^{VI}_{53/52}$--.

Col. 14, line 5 "$R_{50/52}^{III}$" should read --$R^{III}_{50/52}$--.

Signed and Sealed this

Twenty-fifth Day of December, 2007

JON W. DUDAS  
*Director of the United States Patent and Trademark Office*